United States Patent [19]
Masaki et al.

[11] Patent Number: 6,053,046
[45] Date of Patent: Apr. 25, 2000

[54] ROTATIONAL SPEED DETECTOR FOR VEHICLE WHEEL WITH SENSOR DEVICE AND INTEGRALLY FORMED AXLE COVER

[75] Inventors: Kazuo Masaki, Chita; Yasuhiro Harada, Anjo; Sumiharu Yokoiwa, Okazaki, all of Japan

[73] Assignee: Denso Corporation, Kariya, Japan

[21] Appl. No.: 08/862,927

[22] Filed: May 27, 1997

Related U.S. Application Data

[63] Continuation-in-part of application No. 08/731,025, Oct. 9, 1996, abandoned, which is a continuation of application No. PCT/JP96/00246, Feb. 5, 1996.

[30] Foreign Application Priority Data

| Feb. 9, 1995 | [JP] | Japan | 7-21800 |
| Mar. 30, 1995 | [JP] | Japan | 7-999652 |
| Jan. 17, 1996 | [JP] | Japan | 8-5785 |
| May 24, 1996 | [JP] | Japan | 8-129566 |
| May 24, 1996 | [JP] | Japan | 8-129887 |

[51] Int. Cl.⁷ .................................................. G01P 3/42
[52] U.S. Cl. .................................. 73/514.39; 324/174
[58] Field of Search .................... 73/514.39, 488; 324/173, 174, 207.15, 207.25; 310/155, 156

[56] References Cited

U.S. PATENT DOCUMENTS

| 3,793,545 | 2/1974 | Leiber et al. . |
| 3,870,911 | 3/1975 | Toyama et al. . |
| 3,928,802 | 12/1975 | Reinecke . |
| 4,259,603 | 3/1981 | Uchiyama et al. . |
| 4,268,771 | 5/1981 | Lace . |
| 4,435,659 | 3/1984 | Peterson . |

FOREIGN PATENT DOCUMENTS

| 51-077522 | 12/1949 | Japan . |
| 57-125183 | 1/1956 | Japan . |
| 48-043678 | 9/1971 | Japan . |
| 59-14061 | 1/1984 | Japan . |
| 59-189475 | 12/1984 | Japan . |
| 61-098378 | 6/1986 | Japan . |
| 62-091262 | 6/1987 | Japan . |
| 63-107854 | 7/1988 | Japan . |
| 63-193361 | 12/1988 | Japan . |
| 2-090060 | 3/1990 | Japan . |

*Primary Examiner*—Christine K. Oda
*Attorney, Agent, or Firm*—Pillsbury Madison & Sutro LLP

[57] ABSTRACT

A detector detects a rotational speed of a rotating object. The detector includes a closed magnetic circuit having a magnet therein, and detects the rotational speed according to a magnetic flux alteration in the closed magnetic circuit. The detector comprises a cylindrical rotor switch, which rotates together with the rotating object, and a fixed sensor device having a magnet, an electromagnetic coil and claws constituting a magnetic switch. At least two magnetic switches are provided in the closed magnetic circuit in order to increase the flux alteration in the circuit and thereby to enhance a detection accuracy.

45 Claims, 26 Drawing Sheets

ROTATIONAL SPEED DETECTOR FOR VEHICLE WHEEL WITH SENSOR DEVICE AND INTEGRALLY FORMED AXLE COVER

CROSS-REFERENCE TO RELATED APPLICATIONS

The present application is a continuation in part of U.S. application Ser. No. 08/731,025 filed on Oct. 9, 1996, now abandoned which is a continuation of PCT Application No. PCT/JP 96/00246 designating the U.S.A. filed on Feb. 5, 1996 which is related to and claims priority from Japanese Applications No. Hei-07-21800, Hei-07-99652 and Hei-08-5785. The present application is also related to and claims priority from Japanese Applications No. Hei-8-129887 and No. Hei-8-129566, both filed on May 24, 1996. All of the five Japanese Applications and the PCT Application are herein incorporated by reference.

BACKGROUND OF THE INVENTION

1. Field of the Invention

The present invention relates to a rotational speed detector having a rotor which rotates in accordance with the rotation of a rotating object detector electromagnetically detecting rotational speeds of the rotating object based on the rotation of the rotor.

2. Description of Related Art

A known rotational speed detector the has a rotor which rotates in accordance with the rotation of a rotating object. The rotor includes a rotor switch having a plurality of pairs of portions having different magnetic resistances alternately arranged A, a magnetic circuit device is arranged separately from the rotor and forms a closed magnetic circuit together with the rotor switch A transducer for converts magnetic flux alternation in the closed magnetic circuit to electric signals. For example, the specification of Japanese Utility Model Laid-Open Publication No. Sho-48-43678 discloses a rotational speed detector for a vehicle wheel having a metal rotor with claws which rotate together with a vehicle wheel, A magnetic core and a permanent magnet fixed to a vehicle body forming a closed magnetic circuit together with the claws and an electromagnetic coil for converting alternation of the magnetic flux in the closed magnetic circuit to alternating current.

In this rotational speed detector, two conditions in the closed magnetic circuit appear alternatively according to rotation of the rotor rotated with the wheel. Namely, the closed magnetic circuit is formed to include the claws of the rotor in the first condition while it is formed to include slits located between the claws in the second condition. Under the alternation of the two conditions, the magnetic resistance in the closed magnetic circuit changes, i.e., a magnetic switch formed in the closed magnetic circuit is turned on or off, thereby creating alternation of the magnetic flux in the closed magnetic circuit. According to the magnetic flux alternation, alternating current in the electromagnetic coil is generated. The frequency and voltage of the alternating current vary according to a magnitude of the magnetic flux change which has a certain relation with the rotational speed of the vehicle wheel. Therefore, the rotational speed of the vehicle wheel can be detected according to the alternating current.

For this type of the rotational speed detector, it is desirable to increase its output in order to improve accuracy of speed detection and to detect a lower rotational speed. In the conventional detector described above, one of the magnetic cores forming the closed magnetic circuit is disposed to face teeth or pillars of the rotor and the other core is disposed to face a portion of the rotor where no teeth are formed. That is, there is only one magnetic switch in the closed magnetic circuit. To increase the output of this detector, an necessary to use a larger size of a permanent magnet and an electromagnetic coil.

Therefore, it is the object of the present invention is to provide an improved rotational speed detector having a higher output without increasing the size of the detector.

SUMMARY OF THE INVENTION

In order to achieve the object mentioned above, two magnetic switches are disposed in the detector for changing the amount of the magnetic flux passing through the closed magnetic circuit The amount of the flux change between the two states in the closed magnetic circuit can be made larger with the present invention than with the conventional detector. When the position of the rotor lower magnetic resistance forms the closed magnetic circuit it is in one state (this state is hereafter referred to as the on state of magnetic switch) and when the position of the heigher magnetic resistance rotor forms the closed magnetic circuit it is in another state (this state is hereafter referred to as the OFF state of magnetic switch). According, the output from the transducer becomes larger. In other words, according to the present invention, the output of the transducer can be made larger and the accuracy of detection can be increased, as compared with that of the conventional detector, by adding one more magnetic switch without making the size of the detector larger.

In a rotational speed detector according to the present invention, a sensor device may be mounted on a immovable portion of a vehicle body and a rotor on a rotating shaft. Conversion of the alternation of magnetic flux to electric signals can be performed solely by the fixed portion.

It is also possible to include magnetic cores in the closed magnetic circuit. In this case, a first and a second magnetic switch having respective claws thereon can be formed on the cores as a single body. Alternatively, one of the switches can be made as a single body on the core and the other on a permanent magnet. In case one of the switches is made on the permanent magnet, the number of parts to be used in a detector can be reduced.

In the rotational speed detector according to the present invention, an axial length of the sensor device mounted on the vehicle body can be shortened and the area facing the rotor switch can be enlarged by making the claws of the first and second magnetic switches align to face each other.

It is also possible to dispose both of the first and second magnetic switches at one side of the rotor switch, i.e., the inside or outside of the rotor switch. In case the magnetic switches are disposed at the inside of the rotor switch, the diameter of the rotor switch can be made larger and, accordingly, the pattern of the rotor switch having portions of higher magnetic resistance and lower magnetic resistance can be made larger. Should the rotor switch be made by stamping a thin magnetic material, it would be advantageous to have a rotor switch with a larger diameter. In case the magnetic switches with the claws are disposed at the outside of the rotor switch, the outer diameter of a whole detector can be smaller by making the number of windows or slits formed on the rotor fewer.

The rotational speed detector can also be designed in the form that the first and second claws forming the magnetic switches are disposed at both sides of the rotor switch, so that the rotor switch is sandwiched between the first claws and the second claws. In this design, the axial length of the detector can be made shorter and the area of the claws facing the rotor switch can be made larger, achieving a higher accuracy of the detector. In other words, the larger claw area facing the rotor switch results in an increased magnetic flux flow when the closed magnetic circuit is brought to the ON-state, thus making the amount of the flux change larger and increasing the accuracy of the detector, accordingly.

It is also possible, to prepare means for positioning the cores, such as holes on the core or projections on a coil spool. This can help improve positioning accuracy in assembling parts of the sensor device, which, in turn, increases the accuracy of detection. In order to obtain an accurate switching of the closed magnetic circuit, it is important to position both cores accurately so that each of the claws on the first and second cores exactly faces each other. Accurate positioning of the cores guarantees distinct switching of the closed magnetic circuit, resulting in an improved detection accuracy.

Moreover, the sensor device to be mounted, for example, on an immovable portion of a vehicle can be molded as a whole by a molding material, so that it can be easily mounted on a vehicle as a wheel speed sensor. In addition, the molding material serves to protect the sensor device from dust and foreign particles and thereby improves its durability.

Also, to minimize leakage flux from the magnetic circuit, an effective width of the magnetic switches can be chosen at an optimum size relative to a length of pillars formed on the rotor according to the present invention.

Further, it is desirable to make a core gap between the magnetic core ends forming the magnetic switches (referred to as C hereafter) in a range of 10 to 65 percent of the effective width of the magnetic switches (referred to as A hereafter). It has become clear through experiments that a dimensional ratio, C/A, must not be too small or too large in the magnetic switch having the bent cores in order to obtain a higher output of the transducer.

A spool or bobbin on which the electromagnetic coil is wound may be eliminated by using an outer periphery of the permanent magnet as the spool. The magnet may be divided into two pieces in its axial direction and may be made by molding a synthetic resin material in which ferrite magnet powder is dispersed. Preferably, the ferrite magnet powder is oriented in the direction encircling the electromagnetic coil wound thereon, so that the magnet is easily magnetized in that direction and thereby reducing leakage flux out of the magnetic circuit. The magnetic cores forming the magnetic switches may be eliminated by using projections formed on outer periphery of the magnet in place of the claws of the cores.

In the case the sensor device is molded into one piece, circular ribs may be provided on both outer sides of the spool in order to ensure a tighter contact between the spool and the cores and to prevent the molding material from further flowing into the magnet side.

DETAILED DESCRIPTION OF THE PREFERRED EMBODIMENTS

The best mode for carrying out the present invention will be explained hereafter, referring to the accompanying drawings.

Figure 1:
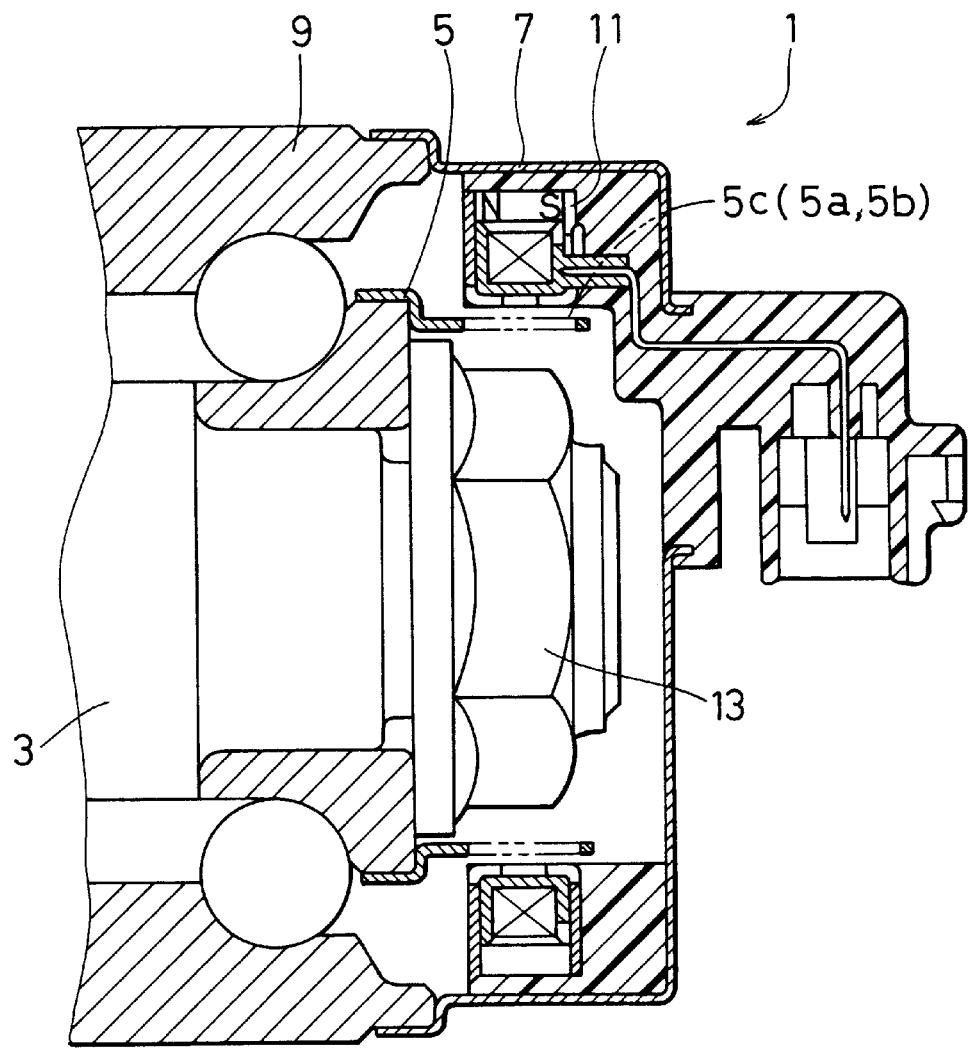
FIG. 1 is a cross-sectional view showing a whole structure of a first embodiment of a rotational speed detector according to the present invention.

FIG. 1 shows a whole structure of a first embodiment for carrying out the present invention. The rotational speed detector shown in FIG. 1 is designed for a wheel speed detector for an automotive vehicle.

The rotational speed detector is mainly composed of a rotor 5 which is mounted on an inner race of a rotor shaft 3 carrying a rotating wheel thereon, and a sensor device 11 mounted on a non-movable part of the vehicle via a housing 7 which is fixed to an outer race of a bearing. The sensor device 11 detects rotational speeds of the wheel in cooperation with the rotor 5. The rotor 5 has a shape of a cylinder encircling a bearing nut 13. On the cylindrical rotor 5, there is formed a rotor switch 5c having pillars 5a and windows 5b which are aligned alternately along a rotating direction of the rotor 5(refer to FIGS. 12 and 14).

Figure 2A:
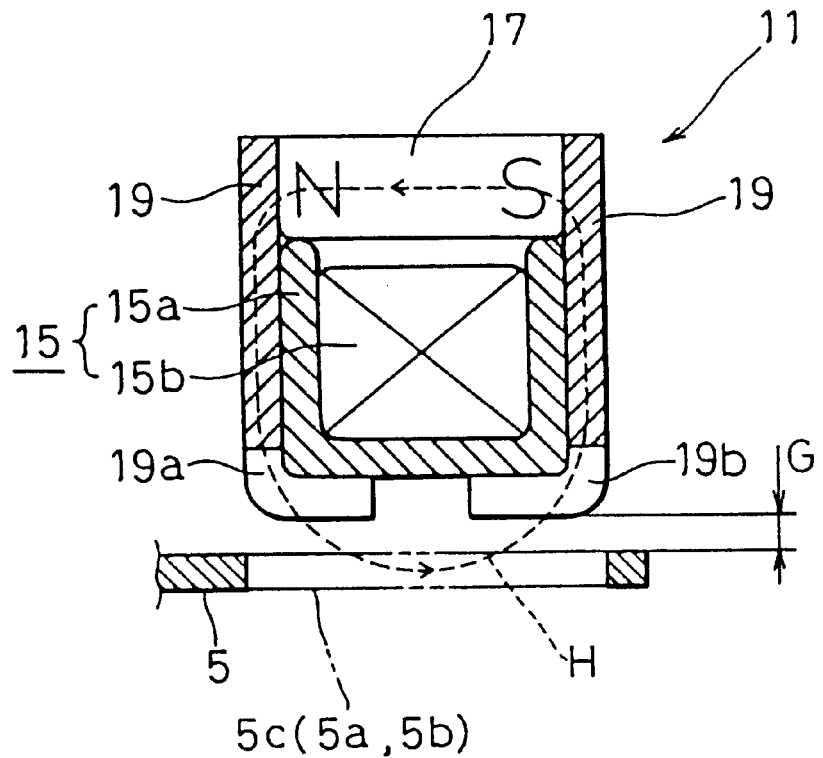
FIG. 2(A) is a cross-sectional view showing a sensor device used in the first embodiment.

The sensor device 11 is ring-shaped surrounding the rotor switch 5c formed on the rotor 5. FIG. 2(A) shows a cross-sectional view of the sensor device 11, and FIG. 2(B) a bottom view (the inner surface) of the sensor device 11. Inside the sensor ring, there is mounted an electromagnetic coil 15 composed of a bobbin 15a and a coil 15b wound thereon. The coil 15b generates electric current according to the rotor switch rotation. A ring-shaped permanent magnet 17 is disposed at the outside of the electromagnetic coil 15. The permanent magnet 17 is magnetized in the axial direction of the rotor 5.

Figure 2B:
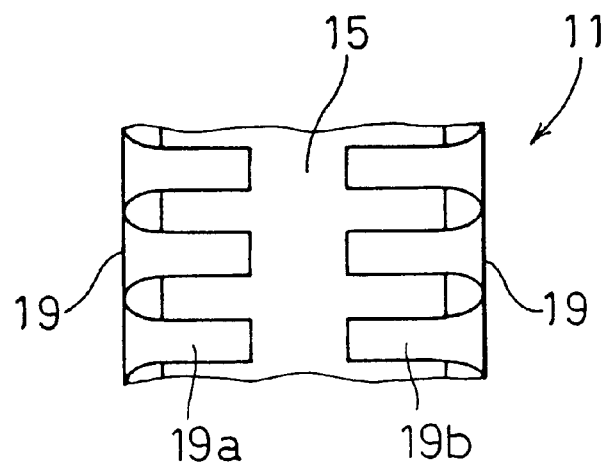
FIG. 2(B) is a bottom view of the sensor device shown in FIG. 2(A)

A pair of magnetic cores 19 is disposed in contact with both ends of the permanent magnet 17. One end of the core 19 is bent as shown in FIG. 2(A) and a series of claws 19a and 19b are formed thereon as shown in FIG. 2(B). The claws 19a form a first magnetic switch and the claws 19b a second magnetic switch, in cooperation with the rotor 5. A pitch or interval of the claws 19a and 19b is made substantially equal to that of pillars 5a formed on the rotor 5. Since the claws of the magnetic switch and the pillars of the rotor switch are formed with the same pitch, when one of the claws faces one of the pillars, all other claws face all other pillars at the same time. At an instant when the claws face the pillars, the magnetic switch is brought to an ON state, and at another instant when the claws face the windows formed on the rotor, the magnetic switch is brought to an OFF state. These two states are repeated alternately as the rotor rotates.

The operation of the sensor device 11 constructed as mentioned above will be explained hereafter. The permanent magnet 17 and the pair of magnetic cores 19 form a closed magnetic circuit "H" as shown in FIG. 2(A) in cooperation with the rotor switch 5c. The closed magnetic circuit "H" is a summation of a series of closed magnetic sub-circuits formed by respective ones of the claws and pillars. The number of the sub-circuits formed is the same as that of pillars of the rotor switch. The closed magnetic circuit "H" is brought to the ON state or the OFF state alternately as the rotor 5 rotates, generating a flux alternation in the closed magnetic circuit "H". According to the flux alternation, an electric signal, a voltage and frequency of which vary in response to the rotational speed of the rotor, is generated in the coil 15b. Thus, the speed of the rotating object connected to the rotor 5 is detected based on the frequency of the alternating current signal generated in the coil.

In the rotational speed sensor according to the present invention, two magnetic switches are provided, i.e., the first switch 19a and the second switch 19b, each of which is formed on the first and the second core, respectively, and arranged to face the rotor switch 5c. In other words, there are two magnetic switches in the closed magnetic circuit "H", and, therefore, it is possible to obtain a larger magnetic flux alternation in the closed magnetic circuit "H", compared with the conventional detector which has only one magnetic switch in the magnetic circuit. Accordingly, a higher output of the alternating current can be obtained from the electromagnetic coil 15. Since the two magnetic switches can be provided almost in the same manner as in the conventional detector, other than making the claws on both of the cores, the rotational speed detector according to the present invention can be manufactured without enlarging the size thereof.

Figure 3:
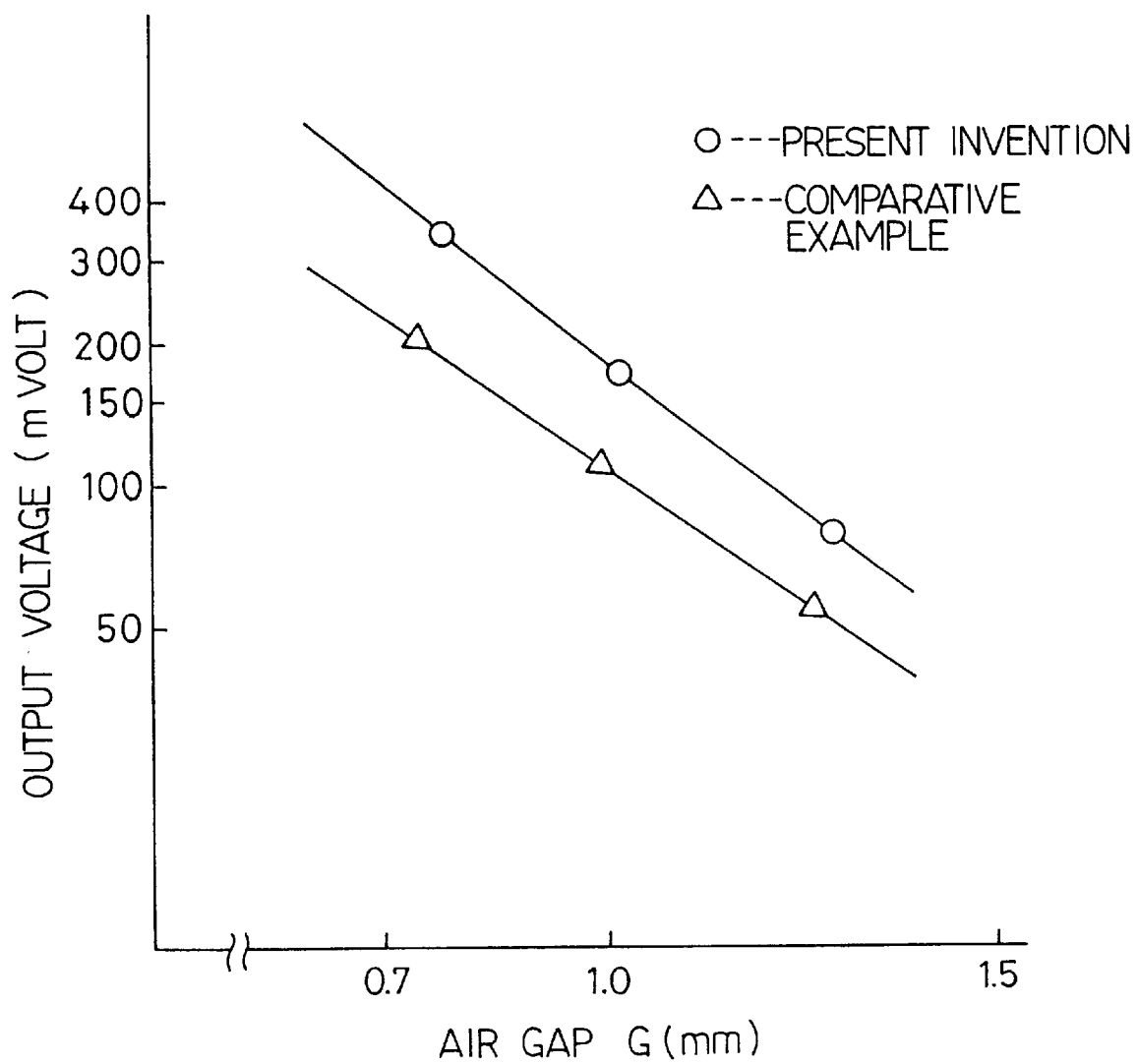
FIG. 3 is a graph showing an advantage of the first embodiment of the present invention.

FIG. 3 shows the output voltage difference between the rotational speed detector having two magnetic switches according to the present invention and a comparative example detector having only one magnetic switch. For the purpose of comparison, the comparative example detector is made so that one of the core ends having no claws faces a portion of the rotor 5 other than the rotor switch 5c and the other core end having the same claws faces the rotor switch 5c as in the present invention. In FIG. 3, the output voltages from two detectors, i.e., the detector according to the present invention and the comparative example, are shown on the logarithmic scale ordinate at various air gaps "G" (air gap distance between the magnetic switch and the rotor switch as shown in FIG. 2(A)) on the abscissa. As seen in FIG. 3, the output voltages decrease according to increase of the air gap G in either case, but it is observed that the output voltage of the detector according to the present invention is 1.5 to 2.0 times larger than that of the comparative example. As has been clear from the above, the output voltage is greatly improved according to the present invention without enlarging the size of the detector. Due to the higher voltage obtained, the detection accuracy is also improved.

In the foregoing embodiment, the closed magnetic circuit is formed by the permanent magnet 17 and the cores 19 together with the rotor switch 5c. The present invention can be also carried out in many forms other than the foregoing embodiment, and many other modifications are possible without departing from the gist of the present invention. For example, it is not necessary to mount the sensor device 11 on a non-movable part and to make the rotor 5 rotate; instead, it is possible to mount the rotor 5 on the non-movable part and to make the sensor device 11 rotate. It is not necessary to arrange all of the first and second claws to face each other in a single phase; however at least some of the first and second claws have to be arranged to face each other to turn the magnetic switch ON and Off using both of the magnetic switches.

Figure 4:
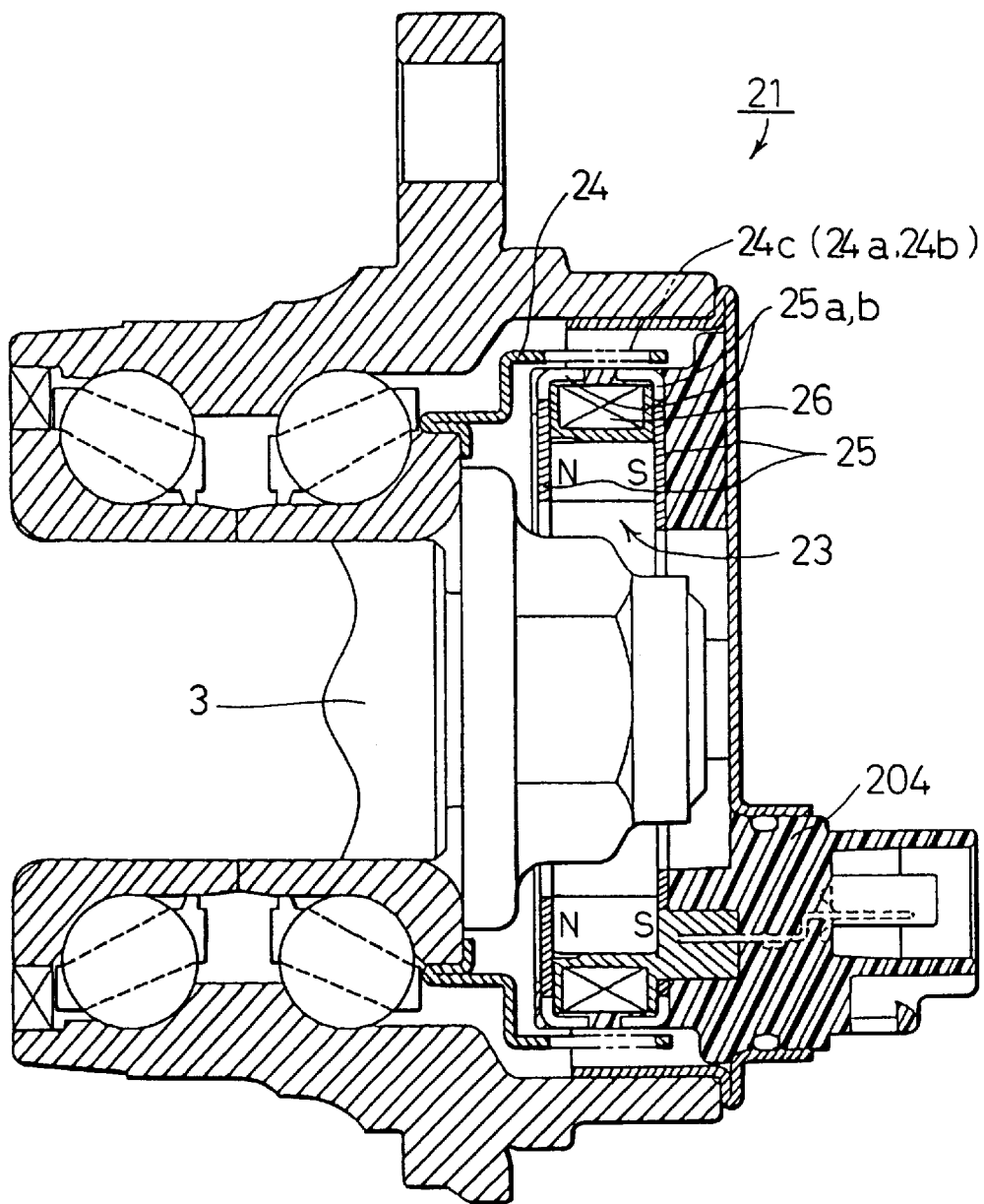
FIG. 4 is a cross-sectional view showing a whole structure of a second embodiment according to the present invention.

FIG. 4 is a cross-sectional view showing a rotational speed detector 21 as a second embodiment of the present invention, wherein a sensor device 23 corresponding to the sensor device 11 of the first embodiment is disposed inside a rotor 24 which corresponds to the rotor 5 of the first embodiment. In this second embodiment, too, a first magnetic switch 25a and a second magnetic switch 25b are provided at the ends of cores 25 which are arranged to face a rotor switch 24c provided on a rotor 24. Since the rotational speed detector constructed as mentioned above includes two magnetic switches which perform the same function as in the first embodiment, it is possible to obtain a high output and, therefore, an enhanced accuracy without enlarging the size of the detector. Particularly, in the second embodiment, since the rotor 24 is disposed at the outside of the sensor device 23, the diameter of the rotor 24 can be made larger than that in the first embodiment. Therefore, the detection accuracy can be further improved.

Figure 5A:
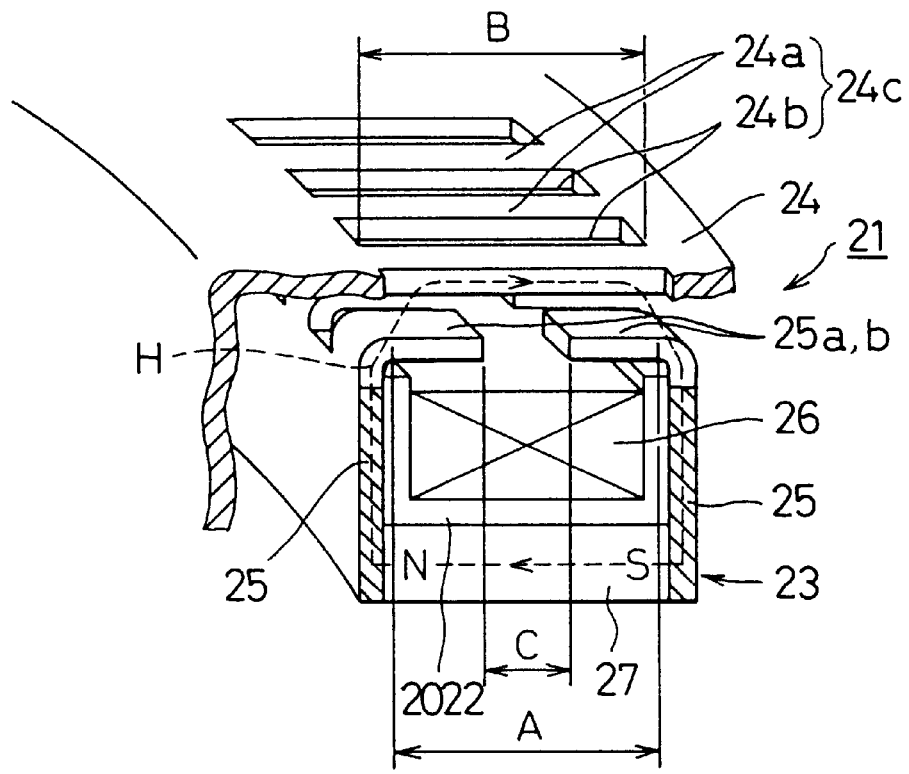
FIG. 5(A) is a perspective view of a sensor device used in the second embodiment, showing important dimensions thereof.

Further, in the second embodiment, various parts constituting the sensor device 23 including (see FIG. 5(A)) an electromagnetic coil 26, a bobbin 2022 on which the coil 26 is wound, magnetic cores 25 and a permanent magnet 27 which is disposed between the cores 25 are all molded in one piece by a molding material 204. Therefore, the rotational speed detector 21 including the sensor device 23 molded in one piece and the rotor 24 can be easily mounted on any objects the rotational speed of which is to be detected. In addition, the sensor device is well protected from dust coming into the device by means of the molding material. Further, connector terminals to take out signals generated in the coil 26 to the outside can be also molded together with other parts by the molding material 204, thereby increasing mechanical strength of the connector terminals.

Figure 5B:
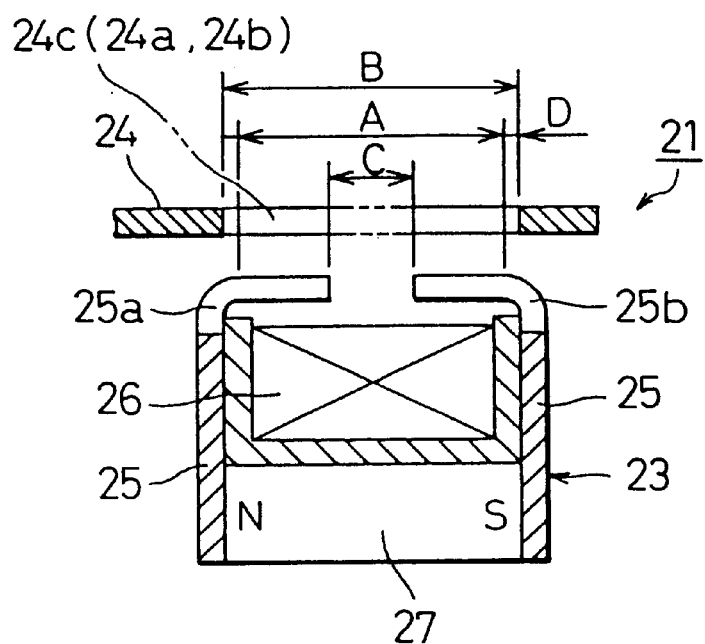
FIG. 5(B) is a cross-sectional view of the sensor device used in the second embodiment, showing important dimensions thereof.

To secure a higher output and a higher accuracy of the rotational speed detector 21, dimensions of some important parts must be optimized. FIG. 5(A) is a perspective view of a critical portion of the detector 21, and FIG. 5(B) is a cross-sectional view thereof. As shown in FIG. 5(A), the rotor switch 24 includes a series of pillars 24a and windows 24b which are disposed alternately. Each end of the cores 25 is bent inwardly and a series of claws 25a and 25b is formed thereon. A permanent magnet 27 and an electromagnetic coil 26 are disposed between a pair of cores 25. A closed magnetic circuit "H" is formed by the magnet 27 and the pair of cores 25 in cooperation with the rotor switch 24c, and the magnetic circuit encircles an electromagnetic coil 26.

As shown in FIGS. 5(A) and 5(B), important dimensions of the detector are named as follows: dimension A is an effective width of the magnetic switch; dimension B is a length of the pillar 24a or the window 24b of the rotor switch 24c; dimension C is a core gap between each end of the cores 25; and dimension D is a length between a right edge of the magnetic switch and a right edge of the window 24b. The rotational speed detector 21 is designed so that the following relations exist among the dimensions mentioned above.

$B-A \geq 0$ $D \geq 0$ $0.65 \geq C/A \geq 0.1$

Figure 6A:
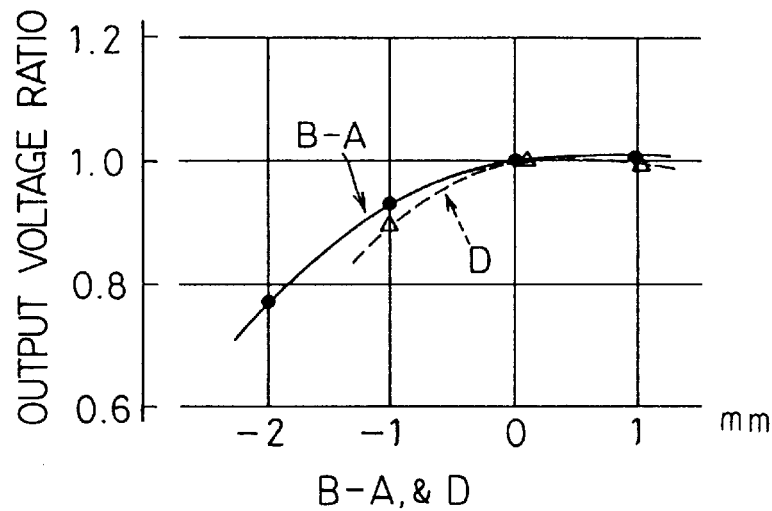
FIGS. 6(A) and 6(B) are graphs showing effects of various dimensions in the second embodiment.

The reason why the relations among those dimensions are set as mentioned above will be explained in reference to FIGS. 6(A) and 6(B). In FIG. 6(A), an output voltage ratio is set at 1.0 when A equals B. As seen in FIG. 6(A), the larger the dimension A becomes beyond the dimension B, the lower the output ratio becomes, and the more the dimension D becomes negative, the lower the ratio becomes. This is because a flux alternation according to ON and Off states of the magnetic circuit becomes smaller. On the other hand, the output voltage ratio does not change much when B−A and D become larger in a positive range. Therefore, a higher output can be secured by making B−A≧0 and D≧0.

Figure 6B:
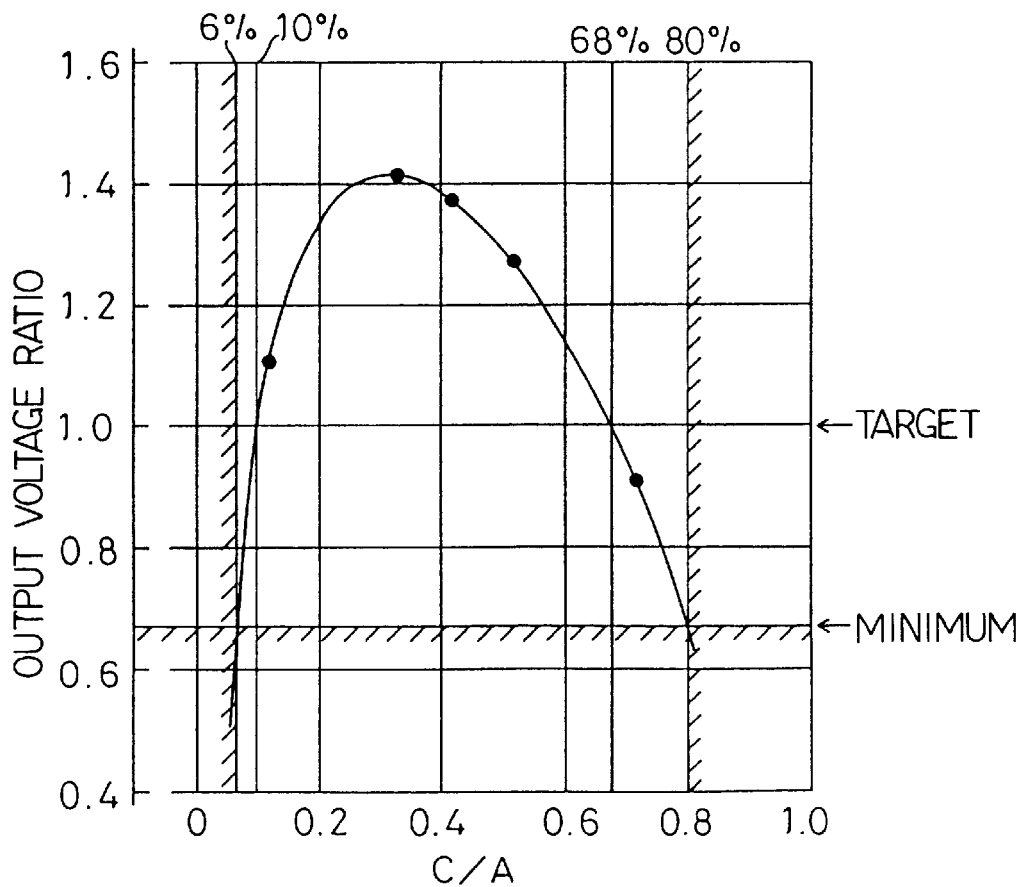

As seen in FIG. 6(B), C/A has an optimum range, i.e., when C/A becomes either too large or too small, the output ratio decreases. Accordingly, C/A should be in a range of 0.1 to 0.68, preferably in a range of 0.1 to 0.65 considering a certain margin.

By setting the relations among those dimensions as mentioned above, the rotational speed detector 21 is able to generate enough output.

Figure 7A:
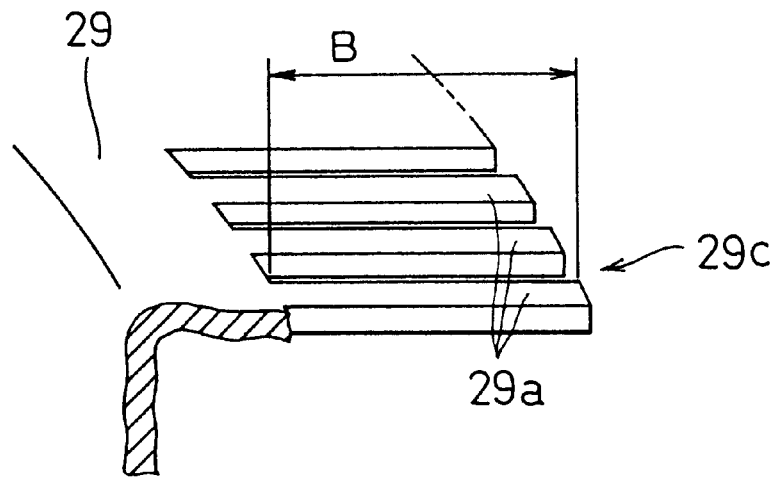
FIG. 7(A) is a perspective view showing a modification of the second embodiment.
Figure 7B:
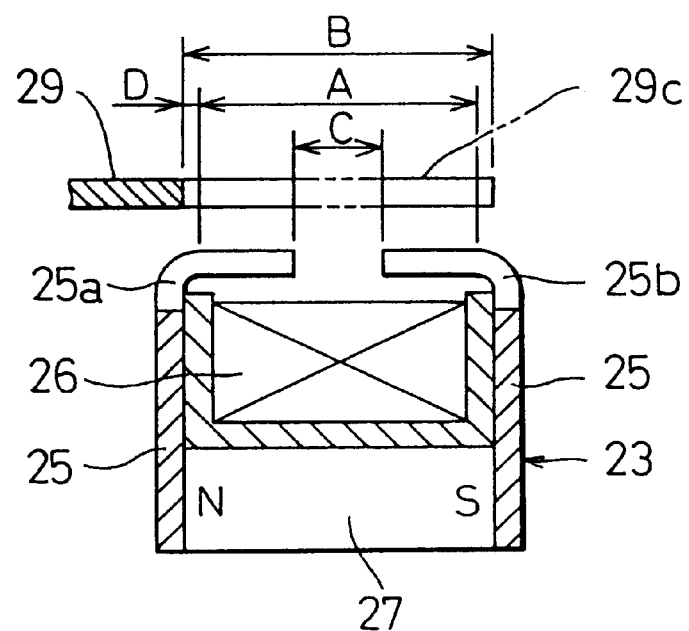
FIG. 7(B) is a cross-sectional view showing the modification of the second embodiment.

The dimension setting mentioned above can be applied also to a modified rotor 29 shown in FIG. 7(A). In the modification shown in FIG. 7(A), the rotor switch 29c is composed of pillars 29a and open slits between the pillars in place of windows 24b in the embodiment shown in FIG. 5(A). The sensor device 23 is disposed inside the rotor 29 to face it as shown in FIG. 7(B). In this case, too, as in the foregoing embodiment, relations among dimensions A, B, C and D are set according to the following formulae.

$B-A \geq 0$ $D \geq 0$ $0.65 \geq C/A \geq 0.1$

With the dimensions thus set, a large enough output can be obtained from the detector.

The dimension setting mentioned above can be applied, as well, to the rotational speed detector 1 as in FIG. 1 in which the rotor 5 is disposed inside the sensor device 11, and the same results can be obtained.

Figure 8A:
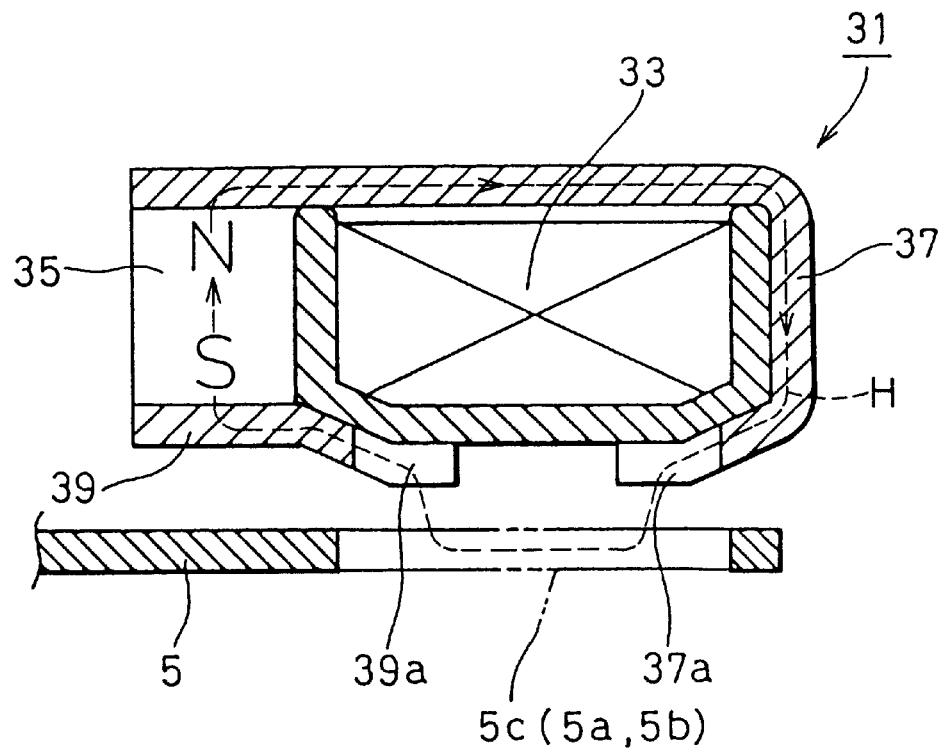
FIG. 8(A) is a cross-sectional view of a sensor device used in a third embodiment.
Figure 8B:
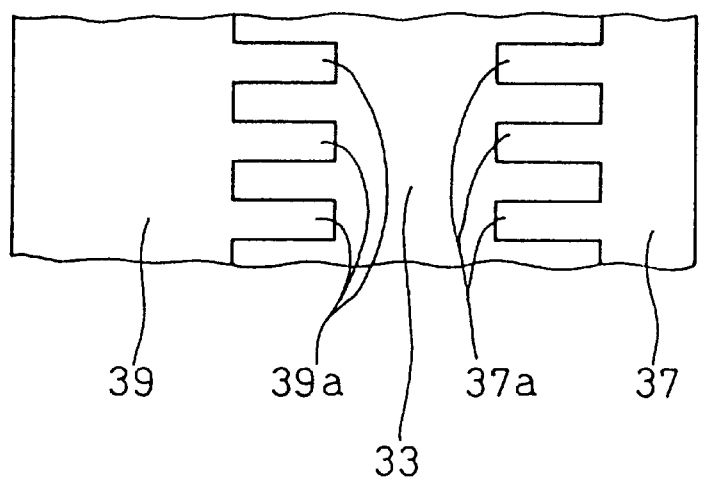
FIG. 8(B) is a bottom view of the sensor device shown in FIG. 8(A).

FIG. 8(A) is a cross-sectional view of a third embodiment of a rotational speed detector 31 according to the present invention. In this embodiment, a ring-shaped permanent magnet 35 is disposed at one side of an electromagnetic coil 33. The permanent magnet 33 is magnetized so that the outside thereof has an N pole and the inside an S pole. A first magnetic core 37 is disposed in contact with the N pole of the magnet 35 and extends to the inside of the coil 33, encircling the outside of the coil 33. A second magnetic core 39 is attached to the S pole of the magnet 35 and extends directly to the inside of the coil 33. Claws 37a and 39a which constitute magnetic switches are formed at the each end of the cores 37 and 39, respectively. These claws are more clearly shown in FIG. 8(B) which is viewed from the bottom of the magnetic switches. The magnetic switches are disposed to face to the rotor switch 5c having pillars 5a and windows 5b. The claws 37a and 39a of the magnetic switches are aligned at the same interval as the pillars 5a of the rotor switch 5c. As the cores 37 and 39 having claws 37a and 39a at the each end thereof are extended to the inside of the coil 33, the length of the rotor switch 5c can be made relatively short. Therefore, the size of the rotational speed detector 31 can be smaller.

Further, in the rotational speed detector 31 according to the third embodiment of the present invention, the permanent magnet 35 is disposed next to the coil 33 along the axial direction of a rotating object. By disposing the magnet 35 and the coil 33 in this way, it is possible to make the diameter of the rotational speed detector 31 smaller, as opposed to a usual arrangement of the components of this kind of the detector which includes a closed magnetic circuit composed of a magnet, cores and a rotor switch, and a transducer having a magnetic coil.

Figure 9:
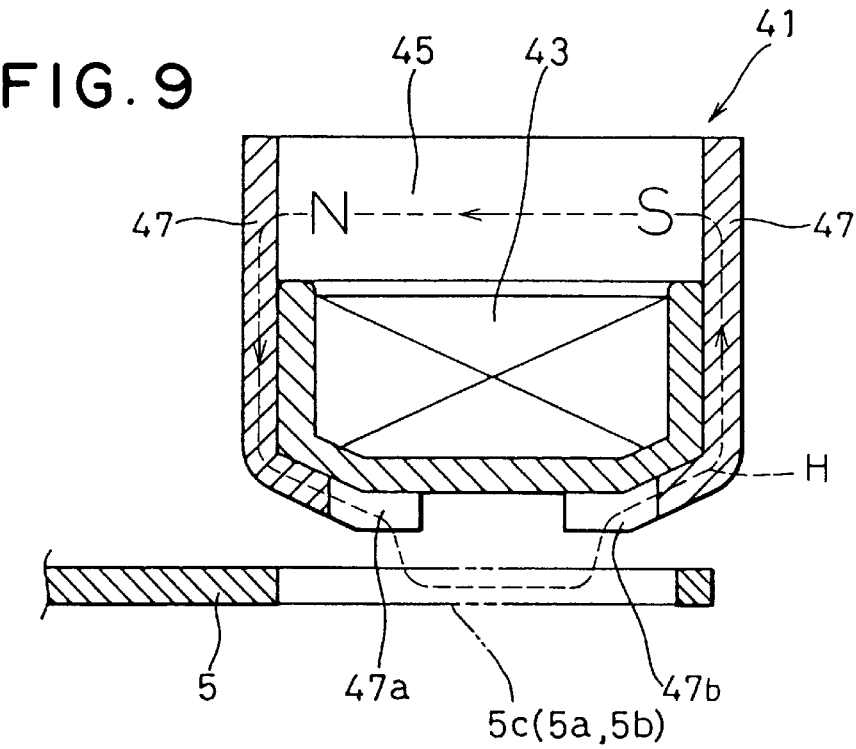
FIG. 9 is a cross-sectional view of a sensor device used in a fourth embodiment.

FIG. 9 shows a cross-section of a rotational speed detector 41 as a fourth embodiment of the present invention. In this embodiment, a permanent magnet 45 which is ring-shaped and magnetized along the axial direction is disposed at the outside of a magnetic coil 43. In contact with each side of the magnet 45, a pair of magnetic cores 47 is disposed. By the pair of cores 47, the magnetic coil 43 is embraced. Claws 47a and 47b constituting magnetic switches are formed at each end of the pair of cores 47, and the magnetic switches are disposed to face the rotor switch 5c having pillars 5a and windows 5b. In this case, too, the claws 47a and 47b are aligned at the same interval as the pillars 5a of the rotor switch 5.

Since each end of the pair of cores 47 is bent inwardly to embrace the coil 43, the length of the rotor switch 5c can be made short, thereby making the size of the detector small.

Figure 10A:
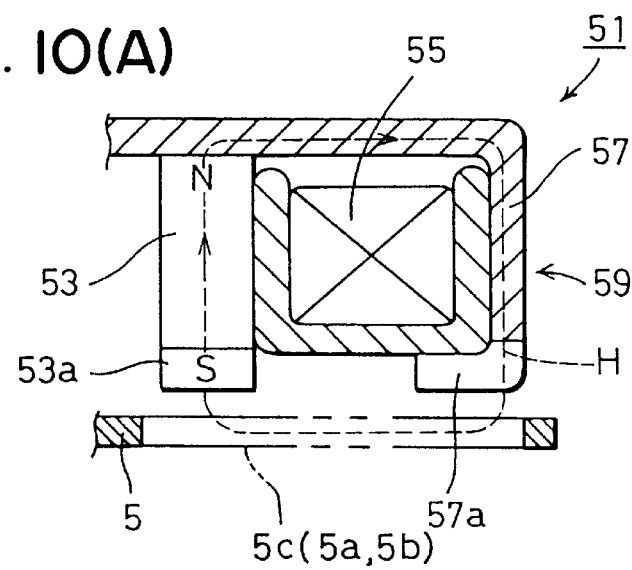
FIGS. 10(A) and 10(B) are a cross-sectional view and a side view of a sensor device used in a fifth embodiment, respectively.
Figure 10B:
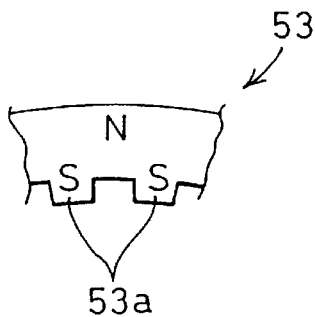

In all the embodiments mentioned above, claws are formed at the each end of the cores to constitute the magnetic switches. This arrangement, however, can be modified as in the following embodiments. FIG. 10(A) is a cross-sectional view of a rotational speed detector 51 as a fifth embodiment of the present invention, and FIG. 10(B) shows a fragmentary side view of a permanent magnet used in the fifth embodiment. As shown in FIG. 10(A), a ring-shaped permanent magnet 53 is disposed next to an electromagnetic coil 55, and is magnetized so that the outside of the magnet 53 has an N pole and the inside an S pole. The inside surface of the magnet 53 has a series of projections 53a made with a certain interval each of which is magnetized as an S pole. The interval of the projections 53 is the same as that of pillars 5a of the rotor switch 5c, so that each of the projections 53 faces one of the pillars 5a on the rotor switch 5c. As shown in FIG. 10(A), a magnetic core 57 is disposed in contact with the outer surface of the ring-shaped magnet 53, and extends toward the coil 55. The end of the core 57 having a series of claws 57a thereon is bent inwardly to hold the coil 55. Each of the claws 57a is formed in alignment with one of the projections 53a on the magnet 53. The claws 57a and the projections 53a constitute magnetic switches and form a closed magnetic circuit "H" in cooperation with the rotor switch 5c. In the closed magnetic circuit "H", there are two magnetic switches, formed by claws 57a and projections 53a respectively, as in the other embodiments mentioned before. Therefore, the detector 51 according to the fifth embodiment of the invention has the same advantage to obtain a higher output in a small size as the other embodiments. Further, as the permanent magnet 53 is disposed next to the coil 55 in the axial direction, the outer diameter of the detector 51 can be made smaller as in the detector 31 of the third embodiment. Moreover, as one of the two magnetic switches is formed directly on the inner surface of the magnet without using a magnetic core, only one magnetic core is necessary in this sensor device 59. This means that the number of parts necessary to construct the sensor device is reduced, and accordingly, the manufacturing cost can be reduced.

Figure 11A:
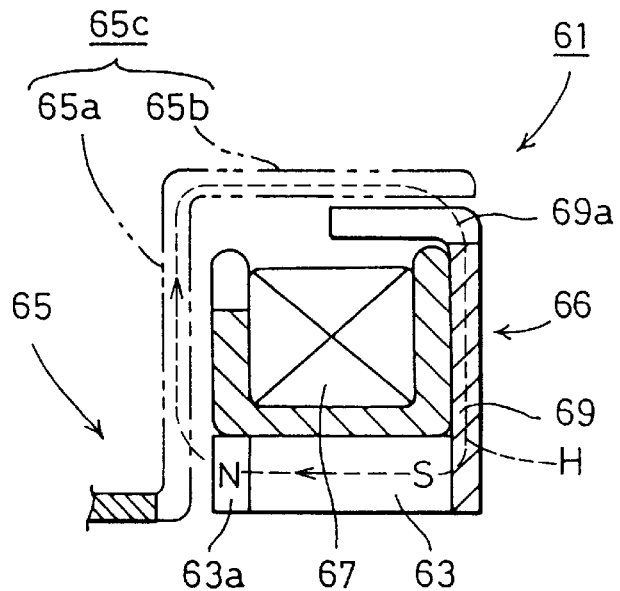
FIGS. 11(A) and 11(B) are a cross-sectional view and a bottom view of a sensor device used in a sixth embodiment, respectively.
Figure 11B:
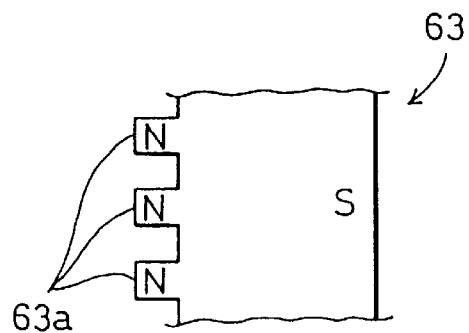

FIG. 11(A) shows a cross-sectional view of a rotational speed detector 61 as a sixth embodiment of the present invention. FIG. 11(B) is a fragmentary view of a permanent magnet used in the sixth embodiment, viewed from the inside of the magnet. As shown in FIG. 11(A), a rotor 65 is composed of a disc portion 65a and a cylindrical portion 65b which is made in a single body with the disc portion 65a. The cylindrical portion 65b is disposed to encircle a sensor device 66. On both of the disc and cylindrical portions, a series of windows or slits are formed to constitute a rotor switch 65c.

A ring-shaped permanent magnet 63 is disposed inside an electromagnetic coil 67 which is also ring-shaped. The magnet 63 is magnetized in the axial direction to have an N pole at one end facing to the disc portion 65a and an S pole at the other end. As shown in FIG. 11(B), the magnet 63 has a series of projections formed at its end facing the disc portion 65a which are all magnetized to have N poles. Each of these projections 63a faces one of windows or slits made on the disc portion 65a. As shown in FIG. 11(A), a magnetic core 69 is disposed in contact with the magnet 63 at its end having an S pole and extends radially along one side of the coil 67 and bent inwardly at the core end to form a magnetic switch 69a. The magnetic switch 69a is constituted by a series of claws the interval of which is the same as that of windows or slits formed on the cylindrical portion 65b of the rotor switch 65c.

A closed magnetic circuit "H" is formed in the rotational speed detector 61 thus constructed by the magnet 63, the core 69 and the projections 63a in cooperation with the rotor switch 65c. In the closed magnetic circuit "H", there are two magnetic switches formed, one by the claws 69a and the other by the projections 63a. Therefore, in the same manner as in the foregoing other embodiments, a high output can be obtained from the detector 61. Further, in this detector 61, only one core 69 is used by replacing the other core with the projections 63a made on the magnet 63. Accordingly, the number of parts necessary for the detector 61 is reduced and the manufacturing cost can be lowered.

Figure 12:
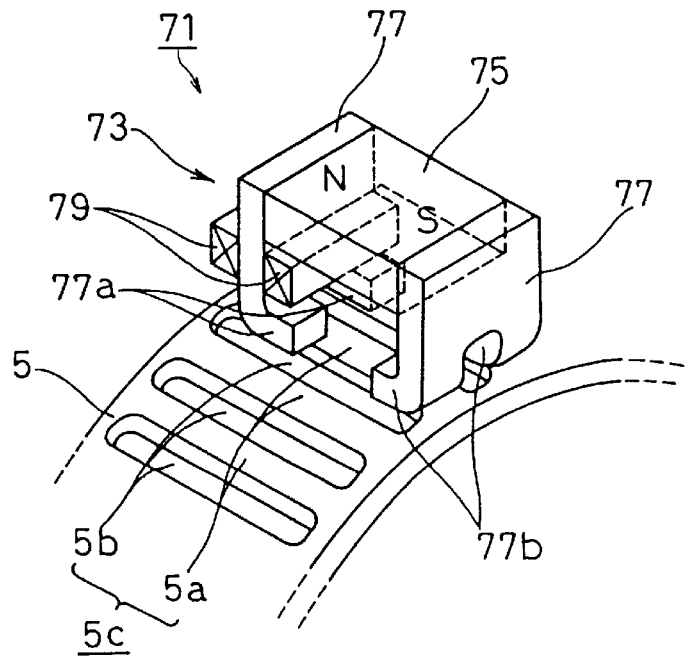
FIG. 12 is a perspective view of a sensor device used in a seventh embodiment.

Though the sensor device in all of the foregoing embodiments is made in a ring-shape facing all over the surface of the rotor, the sensor device can be modified to face a part of the rotor as shown in FIG. 12 as a seventh embodiment. FIG. 12 is a perspective view of a rotational speed detector 71 according to the seventh embodiment of the present invention. A sensor device 73 of this detector 71 faces only a part of the outer surface of the rotor switch 5c having pillars 5a and windows 5b which are the same as in other embodiments. The sensor device 73 is composed of a magnet 75 which is magnetized in the axial direction of the rotor 5, a pair of cores 77 each of which is attached to each end of the magnet 75 and bent inwardly at the end thereof, and a magnetic coil 79 which is wound around one of the cores 77. Claws 77a and 77b are formed on each end of the pair of cores 77 at the same interval as that of the rotor pillars 5a. Therefore, the claws 77a and 77b simultaneously face the pillars 5a or windows 5b of the rotor switch 5c, constituting two magnetic switches. Due to the two magnetic switches of the sensor device 73, a high output and accordingly a high accuracy can be obtained. Particularly in this embodiment, the size of the detector 71 can be further smaller because the size of the sensor device 73 is much smaller than other embodiments mentioned before.

Figure 13:
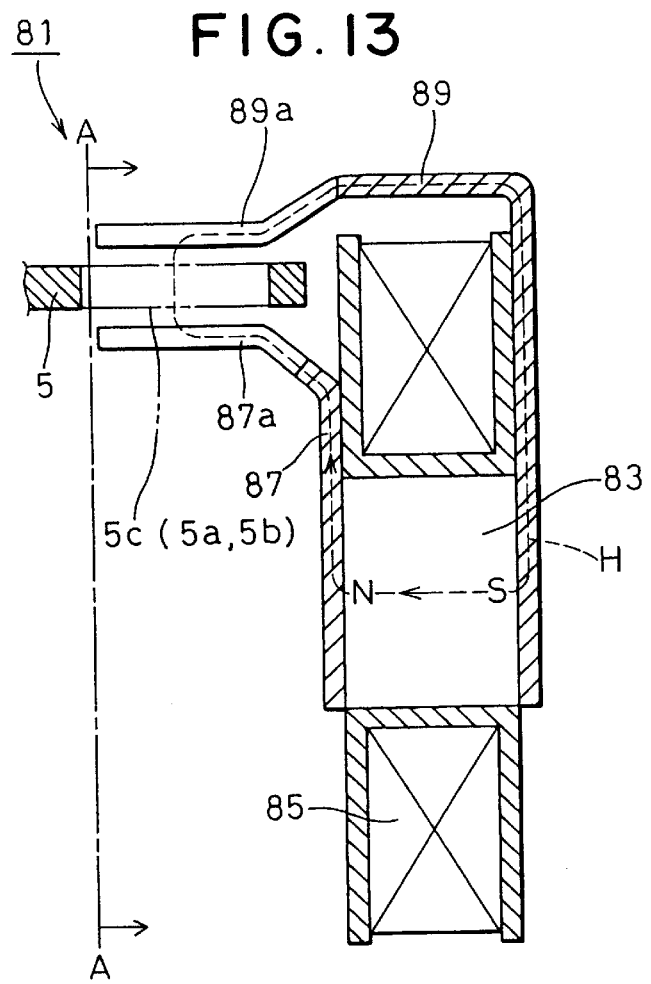
FIG. 13 is a cross-sectional view of a sensor device used in an eighth embodiment.
Figure 14:
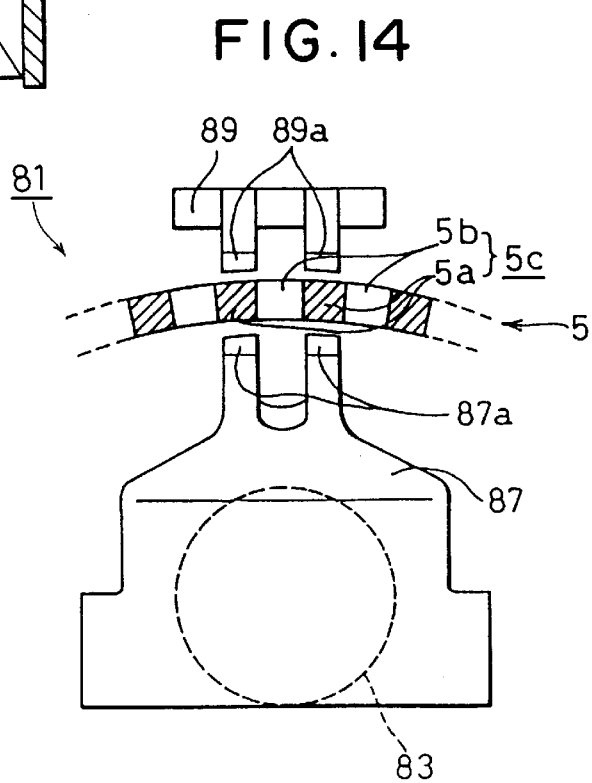
FIG. 14 is a cross-sectional view of a sensor device used in an eighth embodiment, viewed from the A—A section in FIG. 13.

In all of the foregoing embodiments, the sensor device is placed at one side of the rotor switch surfaces. However, this arrangement can be modified so that the sensor device faces both of the surfaces of the rotor switch. FIG. 13 is a cross-sectional view of the rotational speed detector 81 as an eighth embodiment of the present invention, and FIG. 14 is a fragmentary cross-sectional view of the same viewed from the section A—A in FIG. 13. As shown in FIG. 13, a column-shaped permanent magnet 83 is placed along the axial line and magnetized in the axial direction with an N pole at the rotor side and an S pole at the other side. Around the column magnet 83 a magnetic coil 85 is wound. A first magnetic core 87 with a first magnetic switch 87a is disposed in contact with the N pole of the magnet 83 and a second magnetic core 89 with a second magnetic switch 89a is disposed in contact with the S pole thereof. The first magnetic switch 87a and the second magnetic switch 89a are placed to face the inner surface of the rotor switch 5c and the outer surface of the rotor switch 5c with a certain air gap, respectively. In other words, both of the magnetic switches 87a and 89a sandwich the rotor switch 5c with a certain air gap. As shown in FIG. 14, the first and second magnetic cores 87 and 89 have two respective claws forming the magnetic switches 87a and 89a. The pitch of the two claws are the same as that of the pillars 5a of the rotor switch 5c, so that each of the claws faces each of the pillars simultaneously. A closed magnetic circuit "H" is formed by the magnet 83 and the magnetic switches 87a and 89a, in cooperation with the rotor switch 5c in the detector 81. The closed magnetic circuit "H" of this embodiment, too, includes two magnetic switches 87a and 89a therein as in the other embodiments mentioned before. Accordingly, a high output and high accuracy can be obtained from the detector 81 without making its size large.

Figure 15A:
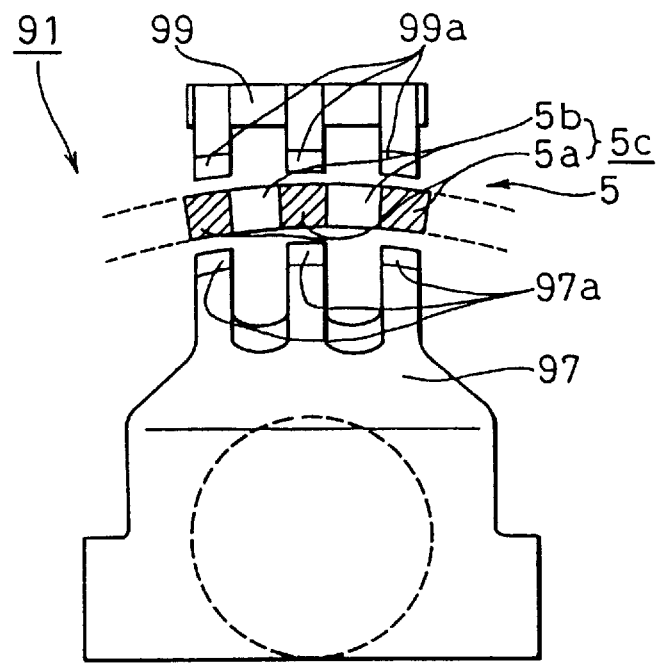
FIGS. 15(A) and 15(B) are cross-sectional views showing other modifications of the sensor device used in the eighth embodiment, viewed from the A—A section in FIG. 13.
Figure 15B:
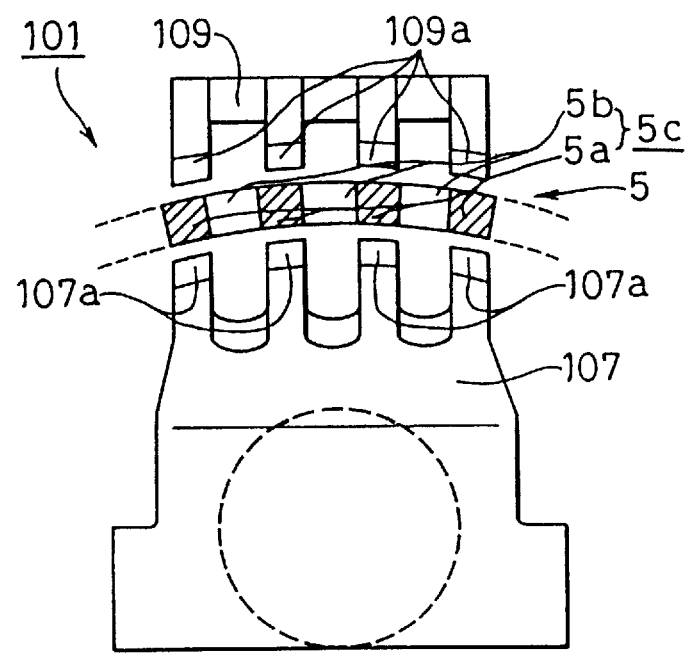

Further, the eighth embodiment of the present invention can be modified so that the magnetic switch is composed of more than two claws. FIGS. 15(A) and 15(B) are fragmentary cross-sectional views showing modifications of the eighth embodiment of the present invention, viewed from the section A—A in the FIG. 13. The rotational speed detectors 91 and 101 shown in FIGS. 15(A) and 15(B) are constructed in the same way as the detector 81 except for the form of the magnetic switches.

In a rotational speed detector 91 shown in FIG. 15(A), a first magnetic core 97 and a second magnetic core 99 have three respective claws 97a and 99a which constitute magnetic switches. In a rotational speed detector shown in FIG. 15(B), four respective claws 107a and 109a are provided on a first core 107 and a second core 109, respectively. Accordingly, a closed magnetic circuit "H" of the detector 91 is composed of three parallel magnetic circuits and that of the detector 101 is composed of four parallel magnetic circuits. By increasing the number of the parallel circuits in the closed magnetic circuit "H", a higher output and higher accuracy can be obtained.

Figure 16:
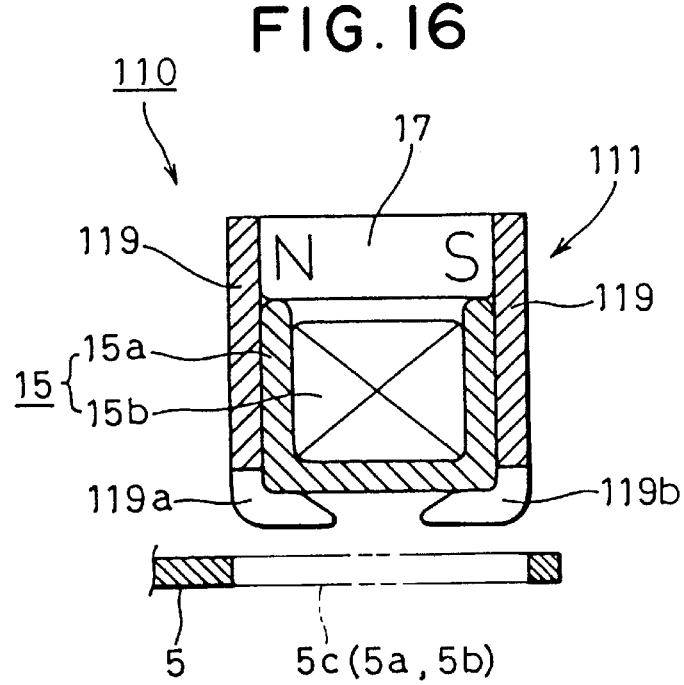
FIG. 16 is a cross-sectional view of a sensor device used in a ninth embodiment.

FIG. 16 shows a sectional view of a speed detector 110 as a ninth embodiment of the present invention. The detector 110 is substantially the same as the first embodiment shown in FIG. 1, FIG. 2(A) and FIG. 2(B), except for a shape of a pair of cores 119 used in a sensor device 111. Therefore, the parts used in this embodiment other than the cores 119 have the same numbers as in FIG. 2(A) and the detailed explanation as to the construction and operation of this embodiment is omitted.

In the rotational speed detector 110, the pair of cores 119, each of which is attached to one side of the magnet 17, extends to hold the electromagnetic coil 15 therein. Each end of the core 119, where the claws 119a and 119b are formed, is bent inwardly to face each other. Each one of the claws 119a and 119b has a slanted or tapered tip as shown in FIG. 16. The slanted tip of the claws is formed so that the gap between the tips of the claws 119a and 119b is the smallest on the claw surface facing the rotor switch 5c and it becomes wider gradually as it becomes more distant from the surface.

Because of the slanted tips of the claws in the rotational speed detector 110, the following advantages can be obtained in addition to the merits of the detector 1 of the first embodiment mentioned above.

Figure 17A:
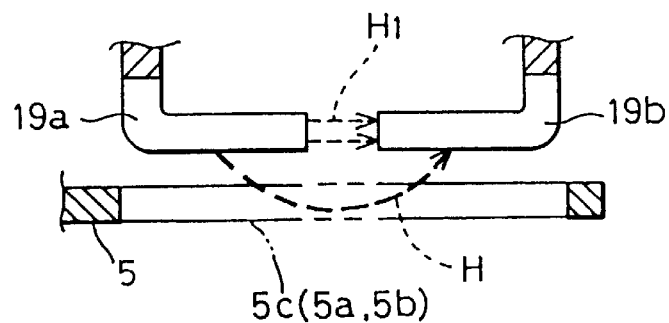
FIGS. 17(A) and 17(B) are drawings showing effects of the ninth embodiment.
Figure 17B:
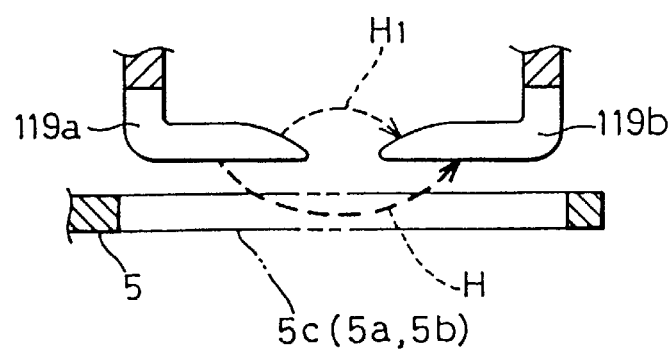

In the case of the detector 1 which has a core gap as shown in FIG. 17(A), when the core gap is made too small, a leakage magnetic path "H1" is formed in the core gap in addition to the main magnetic circuit "H" which passes through the rotor switch 5. As opposed to the case of the detector 1, in the detector 110 which has a slanted core gap as shown in FIG. 17(B), the leakage magnetic path "H1" is not easily formed, because a magnetic flux has a characteristic in general to form a path which is perpendicular to a surface of a magnetic material. In other words, the slanted core gap serves to suppress the flux leakage. As the slanted core gap has the shortest distance at the nearest point to the rotor switch 5c and the surface area of the magnetic switches 119a and 119b facing the rotor switch 5c is the same as in the case of detector 1, the main magnetic circuit "H" passing through the rotor switch 5c can be formed in the same manner as in the case of the detector 1. Thus, the closed magnetic circuit "H" passing through the rotor switch 5c is effectively formed, while the flux leakage is suppressed. Because of this, the core gap in the ninth embodiment can be made smaller than in the first embodiment. Accordingly, the size of the detector 110 can be smaller than the detector 1.

Figure 18A:
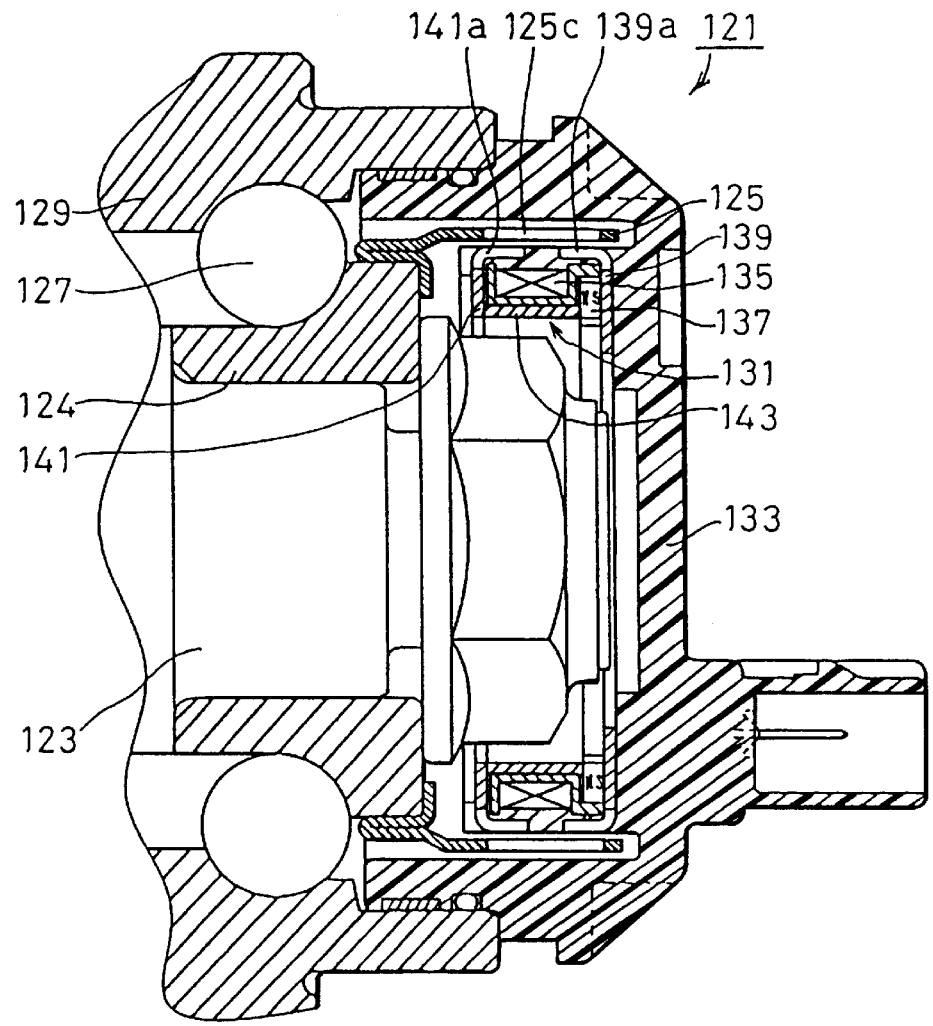
FIG. 18(A) is a cross-sectional view showing a whole structure of a tenth embodiment of the present invention.
Figure 18B:
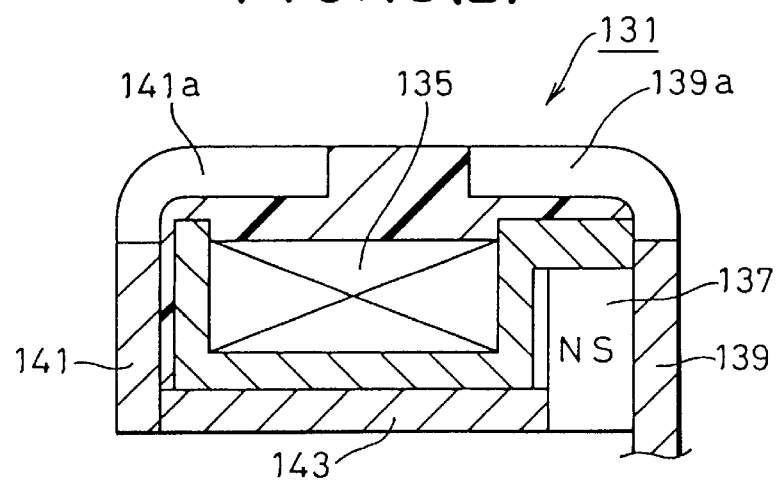
FIG. 18(B) is a cross-sectional view of a sensor device used in the tenth embodiment.
Figure 19:
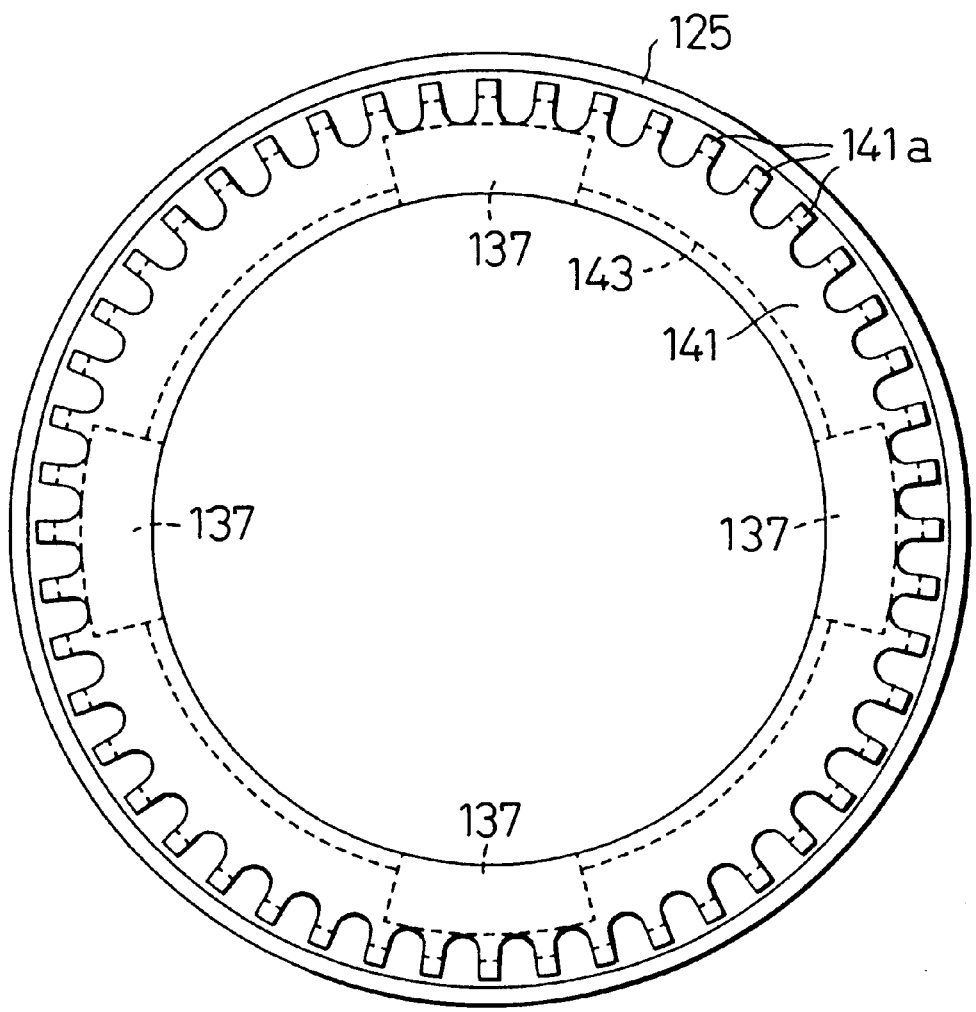
FIG. 19 is a left side view of permanent magnets used in the tenth embodiment.

FIG. 18(A) is a cross-sectional view of a rotational speed detector 121 as a tenth embodiment of the present invention, and FIG. 18(B) is a fragmental cross-section showing a sensor device 131 used in the detector 121. FIG. 19 is a plane view showing permanent magnets 137 used in the sensor device 131, viewed from the left side of the sensor device 131. As shown in FIG. 18(A), the rotational speed detector 121 is composed of a rotor 125 fixed to an inner race 124 of a rotating shaft 123 and a sensor device 131 fixed to a housing 133 which is mounted on a non-rotating outer race 129. The sensor device 131 is disposed inside the rotor 125. The inner race 124 is rotatably mounted to the non-rotating outer race 129 by means of ball bearings 127. The housing 133 is made of a synthetic resin and the sensor device 131 is molded as a single body with the housing 133 in a molding process of the housing 133.

The rotor switch 125c having pillars and windows formed alternately thereon in the same manner as in the aforementioned rotor switch 5 is formed on the rotor 125. The sensor device 131 is composed of, as shown in FIG. 18(B), a permanent magnet 137, an electromagnetic coil 135 disposed next to the magnet 137 in the axial direction, a first disc-shaped magnetic core 139 disposed in contact with one side of the magnet 137, a second disc shaped magnetic core 141 disposed on a side of the coil 135, and a third magnetic core 143 disposed inside the coil 135. The permanent magnet 137 is magnetized in the axial direction with an N pole at its side close to the coil 135. While the magnet 137 may be a ring-shaped one, four arc-shaped magnets disposed inside the disc-shaped first core 139 with an interval of 90-degree are used in the tenth embodiment, as shown in FIG. 19. As shown in FIGS. 18(A) and 18(B), the disc-shaped first core 139 is disposed in contact with the S pole of the magnets 137 and the disc-shaped second core 141 is disposed along one side of the coil 135. Fringes of the first and second core 139 and 141 are bent inwardly to form a series of claws 139a and 141a, respectively. A pitch or interval of the claws 139a and 141a is made substantially equal to that of the pillars of the rotor switch 125c. Thus, the claws 139a and 141a form magnetic switches. The cylindrical third core 143 is disposed inside the coil 135 and forms a magnetic flux path connecting the N pole of the magnets 137 and the second core 141. A closed magnetic circuit "H" is formed by the magnet 137, the third core 143, the second core 141 with the first magnetic switch 141*a*, the rotor switch 125*c* with pillars and the first core 139 with the first magnetic switch 139*a*. In other words, a magnetic flux starting from the N pole of the magnet flows through these parts to the S pole of the magnet. Since the rotational speed detector 121 constructed as mentioned above has two magnetic switches 139*a* and 141*a* and these switches are bent inwardly to face each other, a high output and high accuracy can be obtained from the detector while its size is kept small. In addition, since the magnet 137 and the coil 135 are disposed along the axial direction, the diameter of the sensor device 131 can be made small. Therefore, a whole size of the detector 121 can be made small and it can be easily mounted, for example, inside a hub bearing of a vehicle wheel. Further, due to a shorter length of the closed magnetic circuit "H", a higher efficiency of the detector is attained. Further in this particular embodiment, an amount of permanent magnet used is reduced by using four separate arc-shaped magnets 137 instead of a ring-shaped magnet, and accordingly the detector can be made lighter and the manufacturing cost is reduced.

Figure 20:
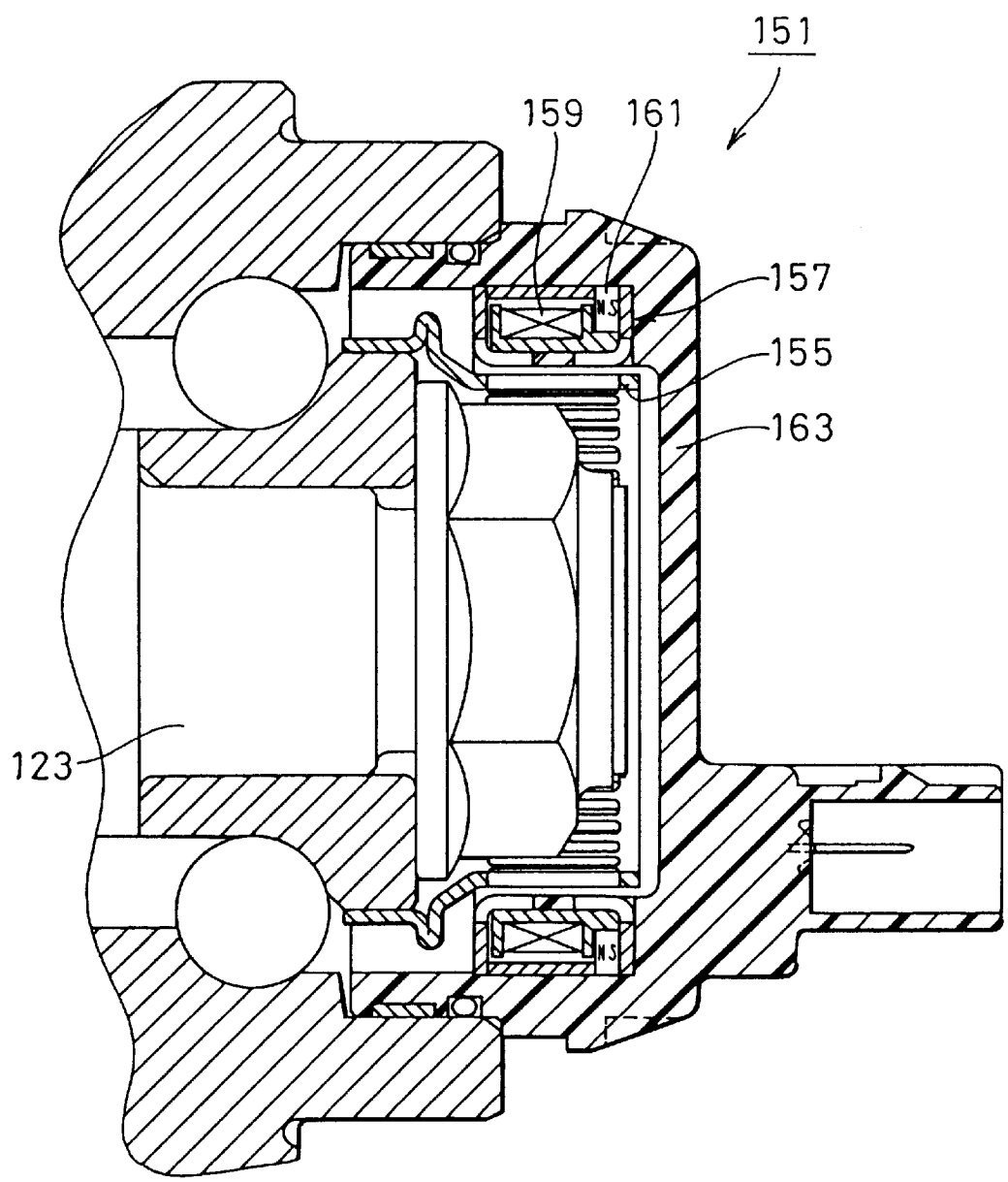
FIG. 20 is a cross-sectional view showing a whole structure of an eleventh embodiment of the present invention.

FIG. 20 shows a rotational speed detector 151 as an eleventh embodiment of the present invention. In this detector, a sensor device 157 is disposed at the outside of the rotor 155. A sensor device 157 of this embodiment is made substantially the same as the sensor device 131 of the tenth embodiment. The only difference is that the outer and inner surfaces of the sensor device 157 are reversed compared with the sensor device 131. Also in this embodiment, magnet 161 is disposed next to a coil 159 in the axial direction and a housing 163 is made by synthetic resin molding together with the sensor device 157, as in the foregoing tenth embodiment. Therefore, the same advantages, such as a smaller size, easy mounting, a higher output, a lighter weight and a lower cost, as in the tenth embodiment can be attained in this eleventh embodiment, too.

Figure 21:
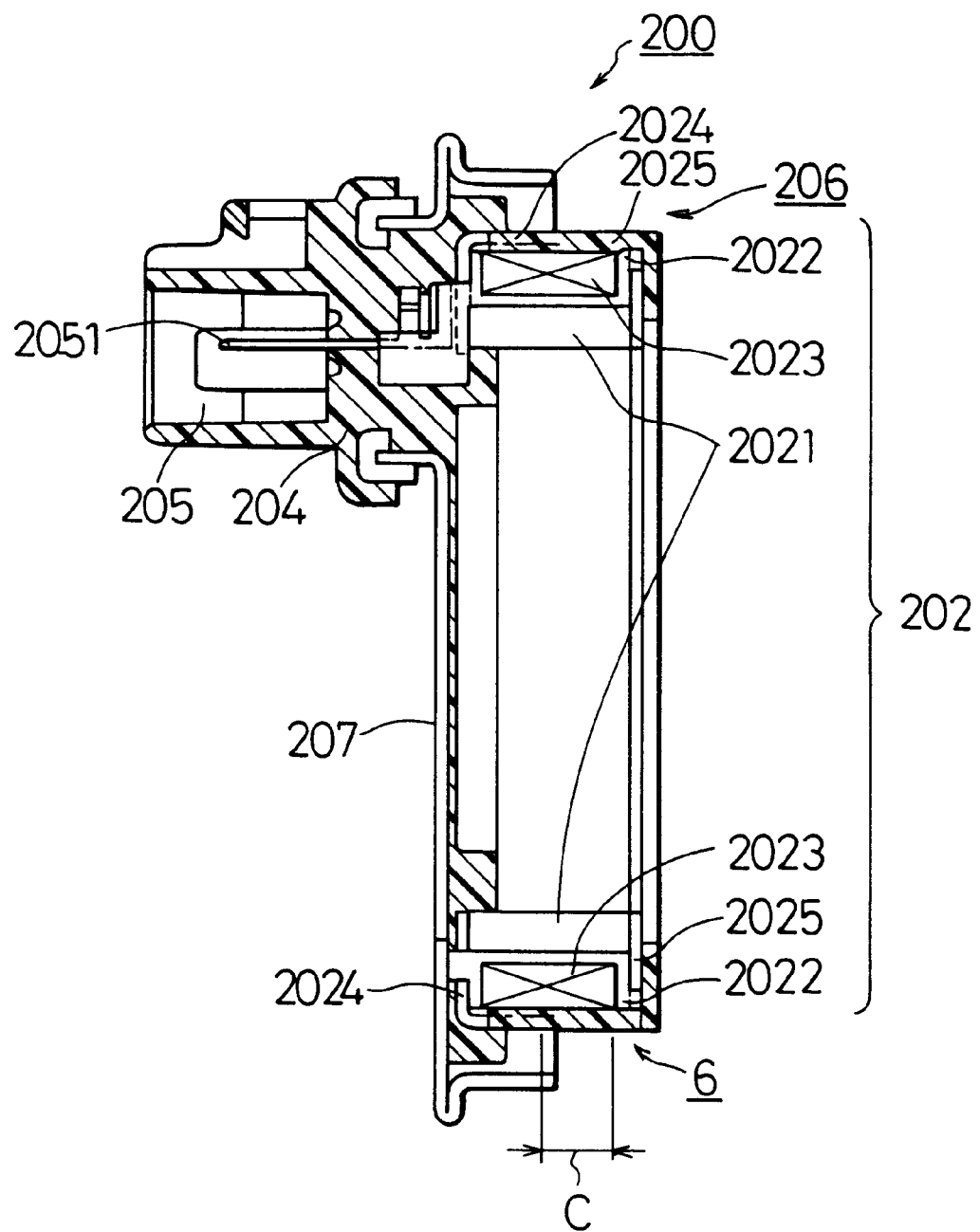
FIG. 21 is a cross-sectional view of a whole structure of a sensor device in a twelfth embodiment of the present invention.

FIG. 21 shows another rotational speed detector 200 as a twelfth embodiment of the present invention. In this embodiment, a sensor device or an electromagnetic pickup 202 is molded together with a housing 207 which is mounted on a non-movable portion (not shown in the drawing) to cover an end of a rotating object (not shown in the drawing). A ring-shaped electromagnetic coil 2023 is molded by a synthetic resin together with a cylindrical housing 207. An end portion of the rotating object, for example, a wheel shaft of a vehicle, is disposed coaxially with the sensor device 202 at the inside thereof. A rotor made of a magnetic material with claws and windows thereon (not shown in the drawing) which is mounted on the rotating object is disposed at a peripheral space 206 of the sensor device 202 with a certain air gap therebetween. The sensor device 202 is composed of a cylindrical spool or bobbin 2022, an electromagnetic coil 2023 wound on the spool 2022, a cylindrical magnet 2021 disposed on the inside of the spool 2022, and a pair of ring-shaped magnetic cores, i.e., a first core 2024 and a second core 2025, which are disposed in contact with both ends of the magnet 2021.

Figure 22A:
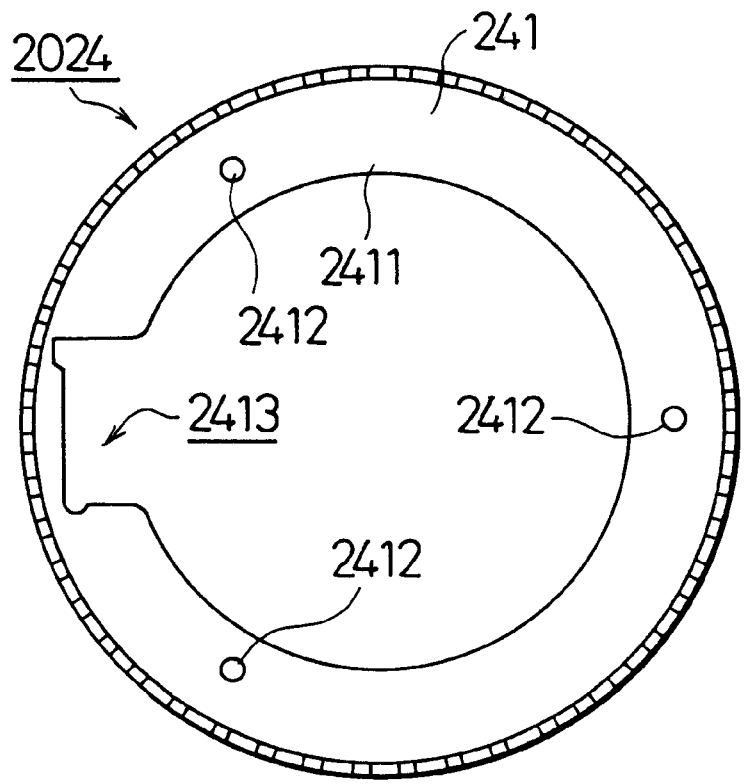
FIGS. 22(A) and 22(B) are drawings showing a first core with positioning means, used in the twelfth embodiment.
Figure 22B:
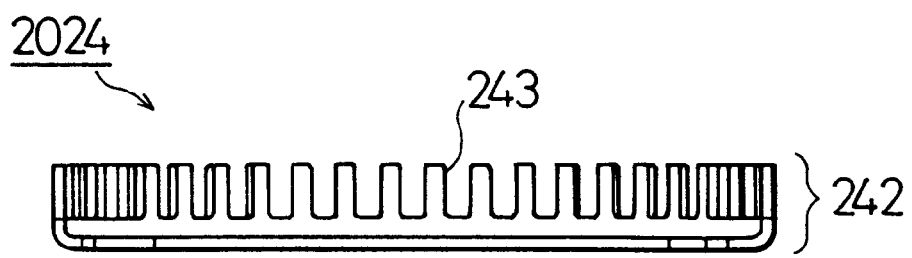
Figure 23A:
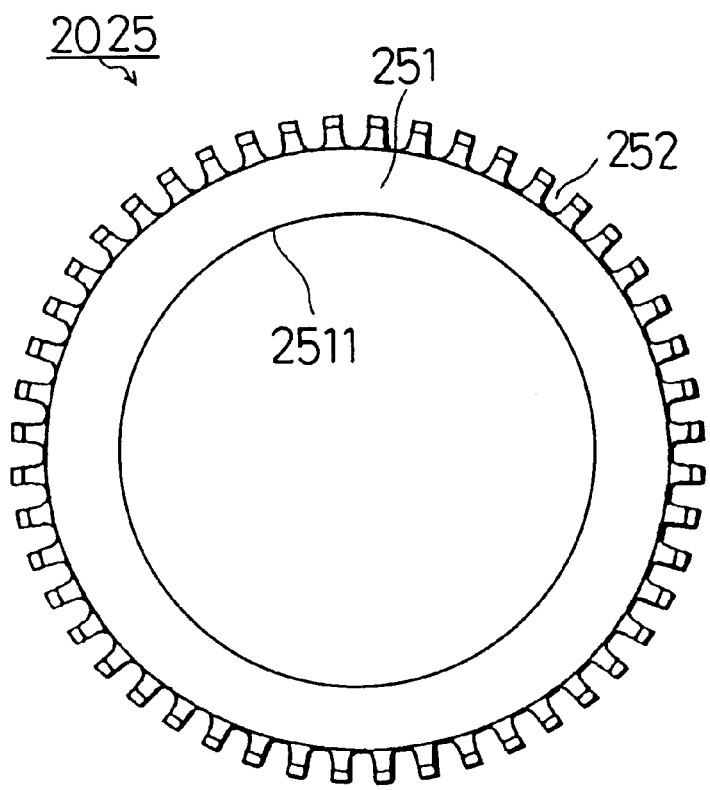
FIGS. 23(A) and 23(B) are drawings showing a second core with positioning means, used in the twelfth embodiment.
Figure 23B:
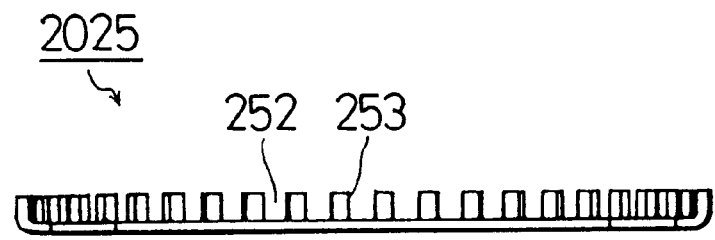

FIGS. 22(A) and 22(B) show the first core 2024, and FIGS. 23(A) and 23(B) show the second core 2025. These cores are made of a magnetic material and formed into a substantially ring-shape. These cores 2024 and 2025 are assembled to hold the ring magnet 2021 and the ring-shaped coil 2021 therein and are disposed perpendicular to the axial direction of the rotor shaft, constituting a magnetic circuit in cooperation with the rotor disposed at the peripheral space 206. An outer peripheral portion of the ring-shaped cores 2024 and 2025 is bent inwardly and a series of claws 243 and 253 is formed on the inwardly bent portion. The respective claws 243 and 253 face each other with a certain core gap which corresponds to the dimension C shown in FIGS. 5(A) and 5(B). Each one of the claws 243 is aligned to face one of the claws 253. In other words, the cores 2024 and 2025 are assembled on the spool 2022 so that all the claws exactly face each other.

As shown in FIGS. 22(A) and 22(B), the first core 2024 consists of two portions, a flat ring-shaped rib 241 and a series of claws 243 formed on a peripheral portion of the rib 241 at an equal interval from each other and bent perpendicularly to the rib 241. In the drawings, equally spaced 48 claws are shown as an example. The inner peripheral portion 2411 of the rib 241 contacts a side of the cylindrical magnet 2021 when assembled. Equally spaced 3 holes 2412 are made on the rib 241 for positioning the core 2024 against the spool 2022. There is an opening at the center of the first core 2024 to accommodate an end portion of a rotating object. Another opening 2413 is provided in the core 2024 for accommodating a connector 205 shown in FIG. 21.

As shown in FIGS. 23(A) and 23(B), the second core 2025 consists of two portions, a flat ring-shaped rib 251 and a series of claws 253 formed in the same manner as in the first core 2024. An inner peripheral portion 2511 of the rib 251 contacts the other side of the magnet 2021 in the same manner as the peripheral portion 2411 contacts one side of the magnet 2021. The claws 253 are formed equally spaced from each other and the number of the claws 253 in this example is 48, which is the same as that of the claws 243 formed on the first core 2024, so that each claw of one of the cores faces one of the claws of the other core with the core gap C when assembled. Spaces 252 formed between the claws 253 are used for fitting-in the second core 2025 to the spool 2022.

Figure 24A:
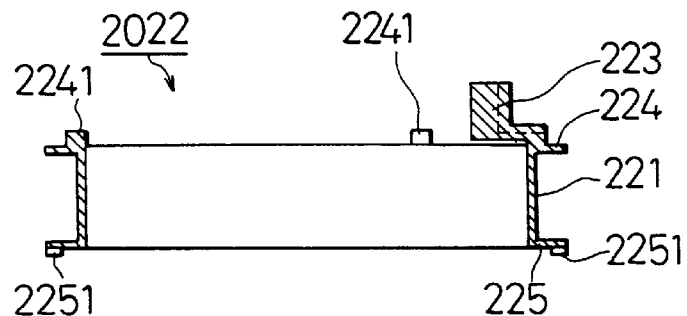
FIGS. 24(A), 24(B) and 24(C) are drawings showing a spool used in the twelfth embodiment.
Figure 24B:
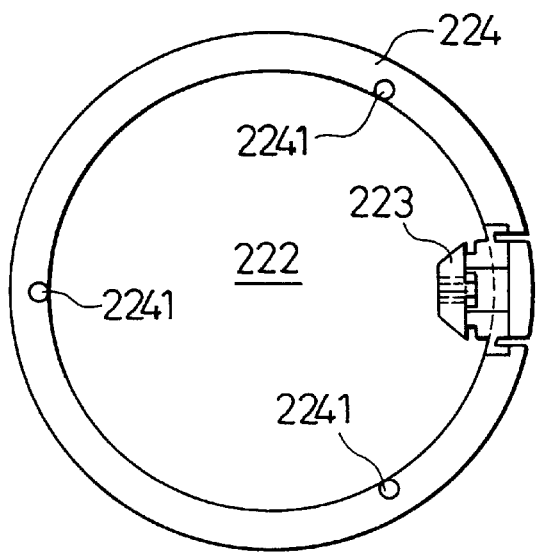
Figure 24C:
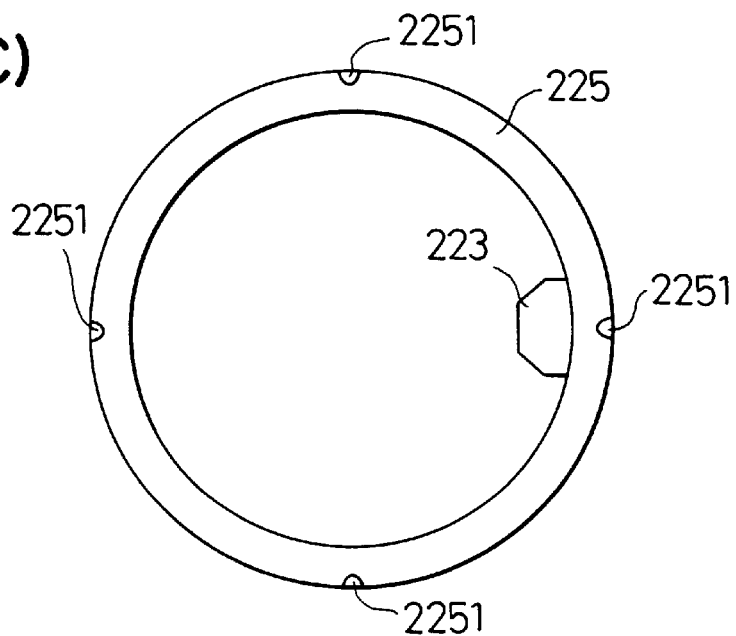

FIG. 24(A) shows a cross-sectional view of the spool or bobbin on which the cores 2024 and 2025 are assembled. FIGS. 24(B) and 24(C) show a top surface of the spool 2022 and a bottom surface of the same, respectively. The spool 2022 is bobbin-shaped and a groove 221 in which the coil 2023 is wound is provided thereon. A hollow space 222 inside the spool 2022 is a space for accommodating an end portion of a rotating object. The first core 2024 is assembled on the top surface 224 where a connector terminal support 223 is provided. The connector terminal 2051 shown in FIG. 21 is taken out through the connector terminal support 223. Three bosses 2241 are provided, equally spaced, on the top surface 224 of the spool 2022. These bosses 2241 are inserted into the three holes 2412 provided on the rib 241 of the first core 2024 when the first core 2024 is assembled on the spool 2022. Four projections 2251 are provided, equally spaced, on the bottom surface 225 of the spool 2022. These projections 2251 are inserted into the space 252 formed between the claws 253 of the second core 2025 when the second core 2025 is assembled on the spool 2022.

When the second core 2025 is assembled on the spool 2022, the claws 253 are always located at both sides of the projections 2251. Therefore, it is easy to design a position of the bosses 2241 on the spool 2022 so that each claw 243 of the first core 2024 always faces one of the claws 253 of the second core 2025 when the first and second cores 2024 and 2025 are assembled on the spool 2022. The coil 2023 is wound on the spool 2022 before both cores 2024 and 2025 are assembled on the spool 2022, and the magnet 2021 is assembled together with the cores 2024 and 2025. Assembling of these parts is quite easily done because the magnet 2021 attracts the cores 2024 and 2025 made of a magnetic material in the assembling process. Therefore, it is not necessary to use an adhesive material to fix these parts in the assembling process. However, an adhesive material can be used if desired.

In the foregoing embodiment, in order to position the parts to be assembled, bosses and projections are made on the spool 2022 and holes and positioning spaces on the cores 2024 and 2025. However, this can be reversed, i.e., projections or bosses may be made on the cores and holes or grooves on the spool. Also, in this embodiment, the magnetic cores constituting magnetic switches are placed at the outer surface of the sensor device 202. However, the location of the magnetic switches of the sensor device can be modified in many ways. For example, the magnetic switches may be placed at the inside surface of the sensor device or an end surface of the sensor device (e.g., the left end surface of the sensor device in FIG. 21).

Further, the number of the claws on the cores constituting the magnetic switches, which decides an output frequency, may be variably chosen according to the purpose for which the rotational speed detector is used, though it is set to 48 in the foregoing embodiment. It is necessary, of course, to choose the same number of the pillars on the rotor switch as the number of the claws on the cores.

Now, referring to FIGS. 25, 26(A), 26(B) and 26(C), a thirteenth embodiment 300 according to the present invention will be described. The thirteenth embodiment differs from the tenth embodiment shown in FIGS. 18(A) and 18(B) only in the structure of the sensor device, 131 of the tenth embodiment and 301 of the present thirteenth embodiment. Therefore, in FIG. 25, the same parts or elements as in FIG. 18(A) have the same numbers as those in FIG. 18A, and detailed explanation will not be repeated here. The sensor device 301 of the thirteenth embodiment is composed of a magnet spool 302 consisting of a first magnet 302a and a second magnet 302b, an electromagnetic coil 135 wound on an outer groove 302c of the magnet spool 302, and a pair of magnetic cores 139 and 141, all of which are molded in an single body with a housing 133 in a molding process.

Figure 25:
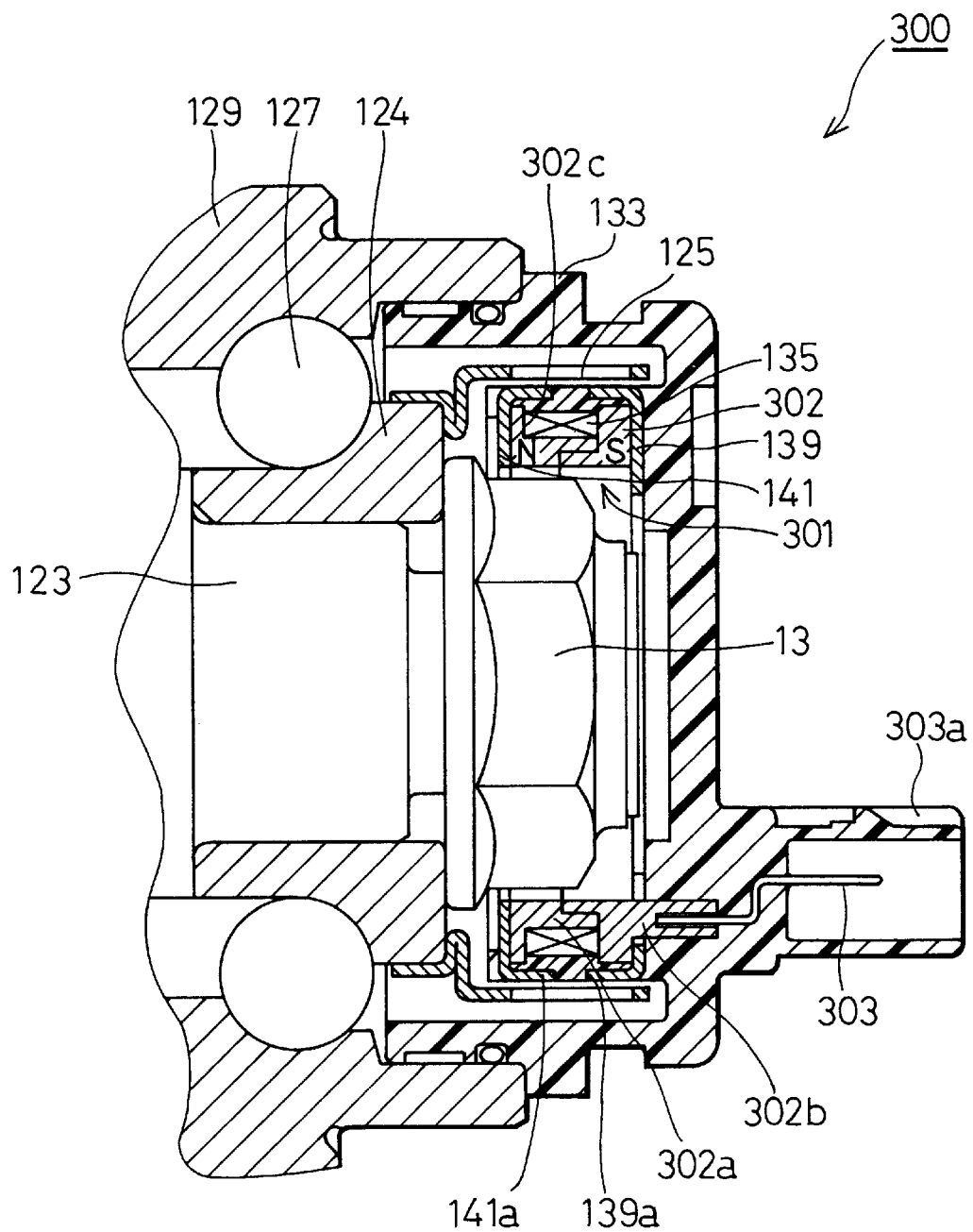
FIG. 25 is a cross-sectional view showing a whole structure of a thirteenth embodiment of a rotational speed detector according to the present invention.

The magnet spool 302 made by combining two magnets 302a and 302b serves to supply magnetic flux to a closed magnetic circuit formed by the sensor device 301 together with the rotor 125 and serves as a spool on which the electromagnetic coil 135 is wound, as well. The magnet spool 302 is magnetized in its axial direction with an N pole contacting the second core 141 and an S pole contacting the first core 139, as shown in FIG. 25. A connector terminal 303 connected to one end of the electromagnetic coil 135 is attached to a projected portion of the second magnet 302b, and disposed in a connector space 303a formed on the housing 133.

A magnetic flux starting from the N pole of the magnet spool 302 passes through the second core 141, the pillars of the rotor 125 and the first core 139, and reaches the S pole of the magnet spool 302, thus making a closed magnetic circuit which encircles the electromagnetic coil 135. In the same manner as in the foregoing embodiments, two magnetic switches formed in the closed magnetic circuit are simultaneously turned on and off alternately as the rotor 125 rotates, and thereby generating electric signals in the electromagnetic coil 135 according to rotational speed of the rotor 125.

Figure 26A:
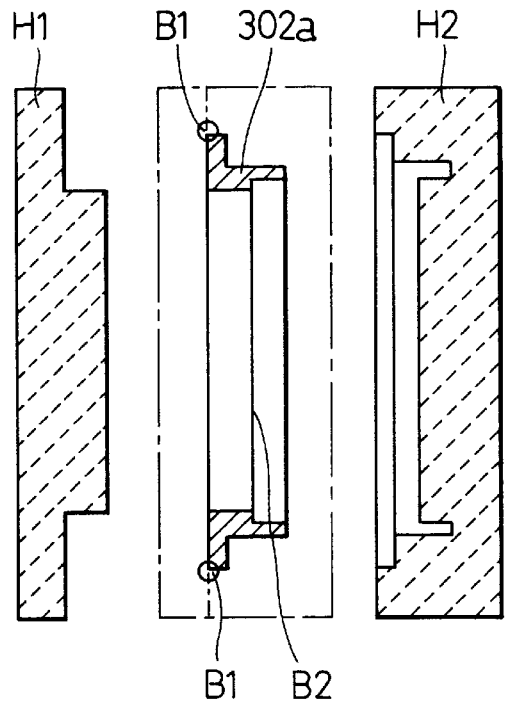
FIGS. 26(A) and 26(B) are cross-sectional views showing dies for molding magnets used in the thirteenth embodiment.
Figure 26B:
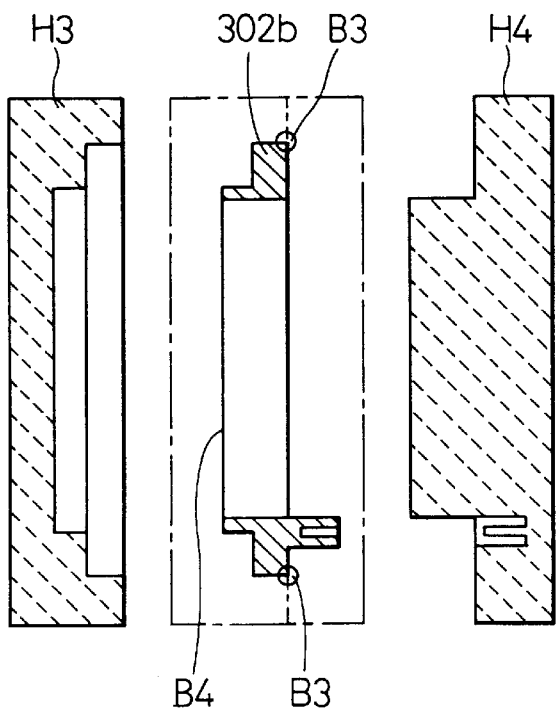
Figure 26C:
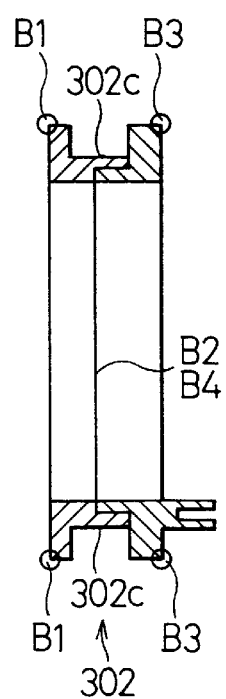
FIG. 26(C) is a cross-sectional view showing a combined magnet used in the thirteenth embodiment.

Both of the magnets 302a and 302b are made of synthetic resin in which the ferrite magnet powder is dispersed. Referring to FIGS. 26(A), 26(B) and 26(C), dies for molding the magnets will be explained. FIGS. 26(A) and 26(B) show dies H1 and H2 for molding the first magnet 302a and dies H3 and H4 for molding the second magnet 302b, respectively. FIG. 26(C) shows the magnet spool 302 formed by combining both magnets. As shown in FIG. 26(A), the first magnet 302a is molded between an upper die H1 and an lower die H2, both of which are overlapped on each other. In the same manner, the second magnet 302b is molded between an upper die H3 and a lower die H4 both of which are overlapped on each other, as shown in FIG. 26(B). In the molding process, burrs are formed in the radial direction at peripheries B1, B2, B3 and B4 of the magnets along the parting lines of the molding dies. These burrs, however, do not appear on the surface of the outer groove 302c, on which the electromagnetic coil 135 is to be wound, when both magnets 302a and 302b are combined as shown in FIG. 26(C). In other words, the molding dies are designed so that the burrs formed in the molding process do not affect the surface of the outer groove 302c of the magnet spool 302. Therefore, insulation of the electromagnetic coil is not damaged by the burrs of the magnets.

In addition, signals to be taken out from the electromagnetic coil 135 do not fatally decrease even when the insulation of the coil 135 including the terminal 303 is broken by some causes and the coil touches the surface of the outer groove 302c of the spool magnet 302, because the magnets are made of a ferrite magnet material which has a high electric resistance. Because of this, it is not necessary to make an insulation coating on the surface of the outer groove 302c of the magnet spool 302. The insulation coating, however, may be made if it is required to secure a higher insulation for some reasons.

The sensor device 301 of this embodiment can be made compact because the magnet spool 302 serves as a magnet for forming the closed magnetic circuit and as a spool for winding the coil thereon. Moreover, efficiency of the closed magnetic circuit increases because its length can be made shorter than that of sensor devices in which the magnet and the spool are provided separately.

Figure 27:
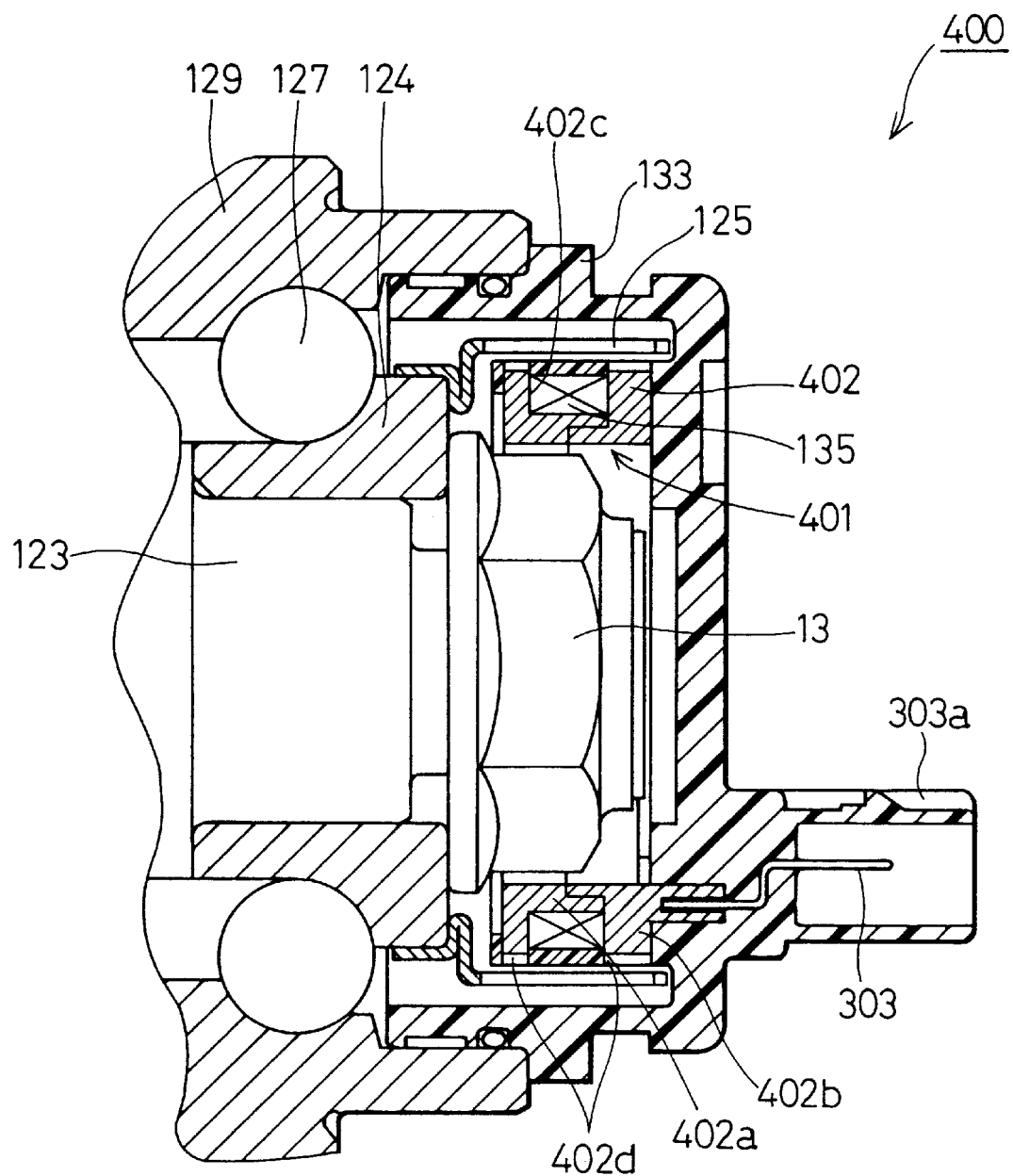
FIG. 27 is a cross-sectional view showing a whole structure of a fourteenth embodiment of a rotational speed detector according to the present invention.
Figure 28A:
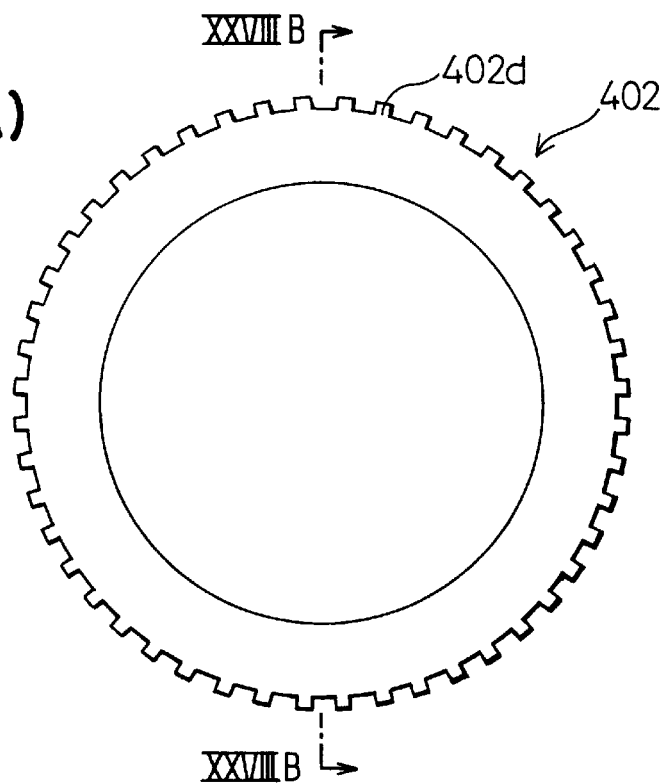
FIG. 28(A) is a plan view showing a magnet used in the fourteenth embodiment.
Figure 28B:
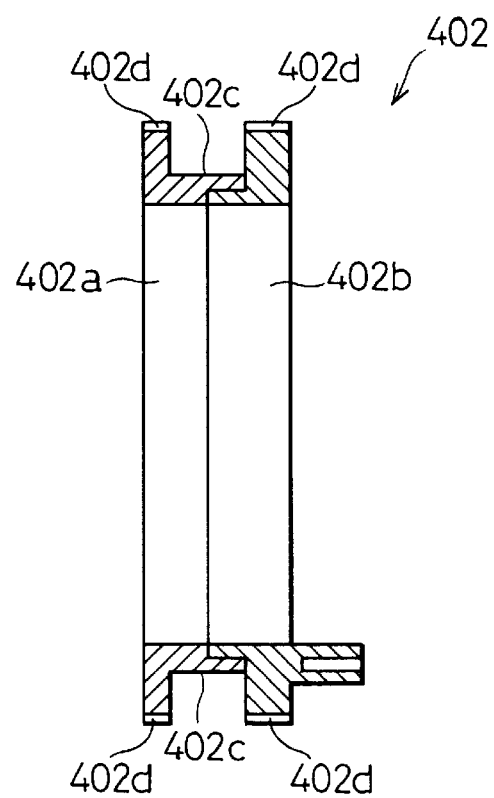
FIG. 28(B) is a cross-sectional view taken along a line XXVIIIB—XXVIIIB of FIG. 28(A) showing a combined magnet used in the fourteenth embodiment.
Figure 29:
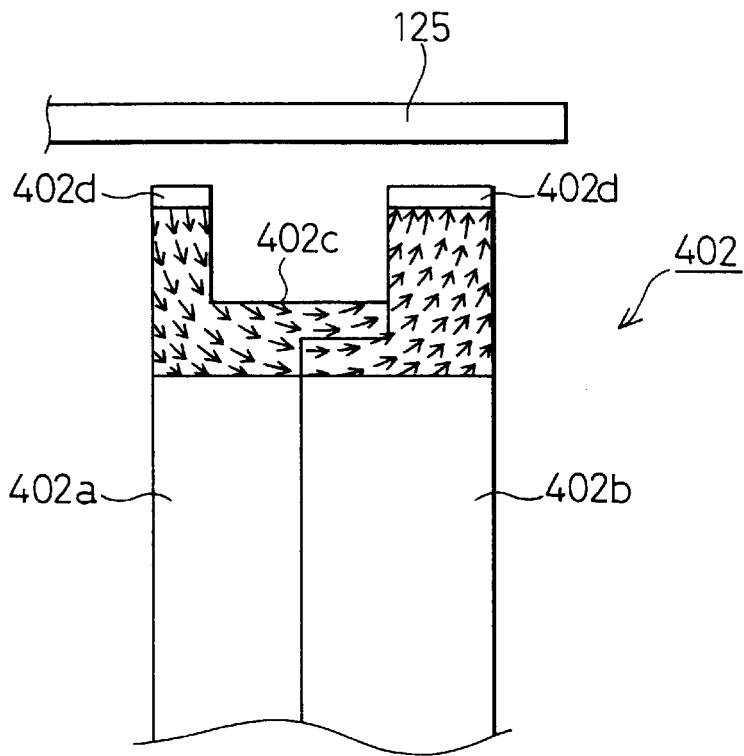
FIG. 29 is a partial cross-sectional view showing an orientation direction of magnet powder in the combined magnet used in the fourteenth embodiment.

Referring to FIGS. 27 to 29, a fourteenth embodiment according to the present invention will be explained. The rotational speed detector 400 shown in FIG. 27 as the fourteenth embodiment differs from the thirteenth embodiment described above only in the structure of the sensor device 401. Compared with the sensor device 301 of the thirteenth embodiment, the pair of cores 139 and 141 are eliminated in the sensor device 401 of the present embodiment, instead, the magnet spool 402 of the fourteenth embodiment has a plurality of projections formed at the outer periphery thereof which perform the same function as the claws of the pair of cores. Since other structures and functions of the rotational speed detector 400 is the same as the detector 300, detailed description is not repeated here. As shown in FIG. 27, the sensor device 401 is composed of the magnet spool 402 having a plurality of projections 402d at its outer periphery and an electromagnetic coil 135, both of which are molded together with the housing 133.

As shown in FIGS. 28(A) and 28(B), the magnet spool 402 is formed by combining a first magnet 402a and a second magnet 402b in the same manner as in the thirteenth embodiment. Each magnet has a plurality of projections 402d formed at its outer periphery with the same intervals with that of the pillars of the rotor 125. Also, the number of the projections 402d is the same as that of the pillars. The magnet spool 402 has an outer groove 402c on which the electromagnetic coil 135 is to be wound.

The first and second magnets 402a and 402b include a ferrite magnet powder material which has a magnetically anisotropic characteristic and is oriented in the direction shown in FIG. 29. The orientation is made so that its direction encircles the outer groove 402c and is substantially perpendicular to the surface of the projections 402d. This is realized by molding the magnets while applying a magnetic field having a desired orientation direction to the magnets. The magnetic field generated by the magnet spool 402 which has magnets thus oriented effectively encircles the electromagnetic coil 135 together with the rotor pillars, making leakage flux minimum, because the magnetically anisotropic magnets are easily magnetized along the oriented direction.

During the molding process of the magnet, an insulating layer (not shown in the drawing) is formed on the surface of the magnet. To form the insulating layer, the molding dies are kept at a temperature exceeding about 100° C., which is higher than a temperature of a usual molding (about 60° C.), during the molding process. When the magnet material composed of synthetic resin with ferrite magnet powder dispersed therein is filled in the molding dies kept at a higher temperature, the resin contacting the hot surface of the molding dies is solidified more slowly than the resin not contacting the surface. Accordingly, the ferrite magnet powder dispersed in the resin is not fixed at the surface of the magnet, but is fixed at an inner portion where the resin is solidified more quickly. As opposed to this, in the case where the dies kept at a lower temperature are used in the molding process, the resin contacting the die surface is cooled down rather quickly, and accordingly the ferrite magnet powder is fixed in the surface of the magnet. By using a higher temperature molding dies, there is automatically formed the insulating layer on the surface of the magnet. This insulating layer serves to ensure insulation of the electromagnetic coil 135 wound on the outer groove 402c of the magnet spool 402.

Since the cores are eliminated and the more efficient magnet spool 402 is used in the sensor device 401 of the fourteenth embodiment, the rotational speed detector can be made more compact and efficient in addition to the advantages of other embodiments. The first and second magnets may be combined to make a magnet spool in various forms other than the form described above, e.g., they may be combined with a plane surface or with sticking portions inserted into depressed portions.

Figure 30:
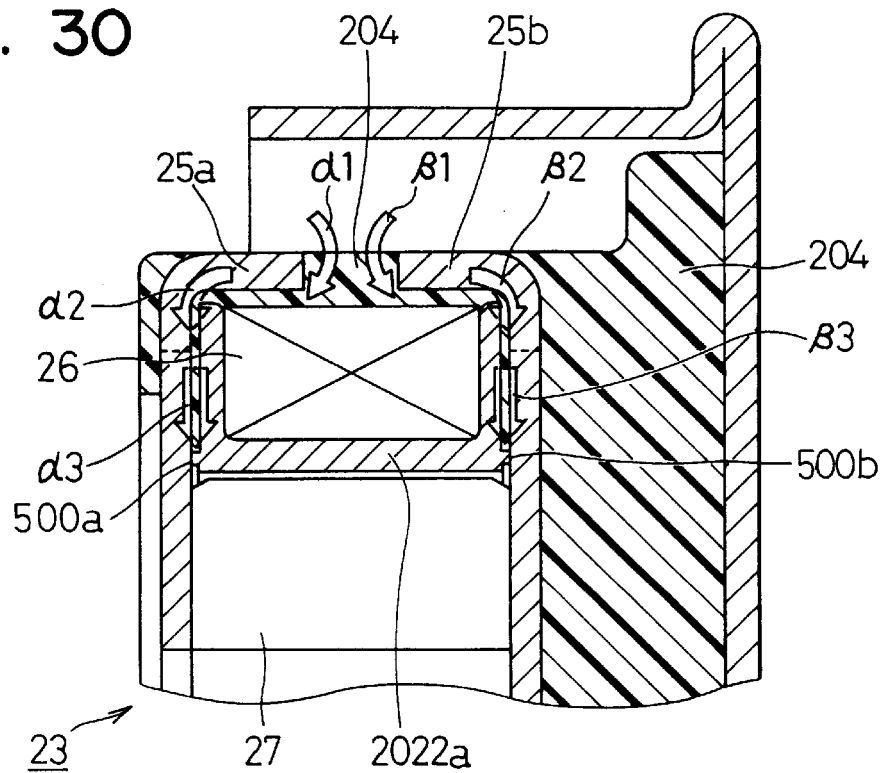
FIG. 30 is a cross-sectional view showing a part of a fifteenth embodiment of a rotational speed detector according to the present invention.
Figure 31A:
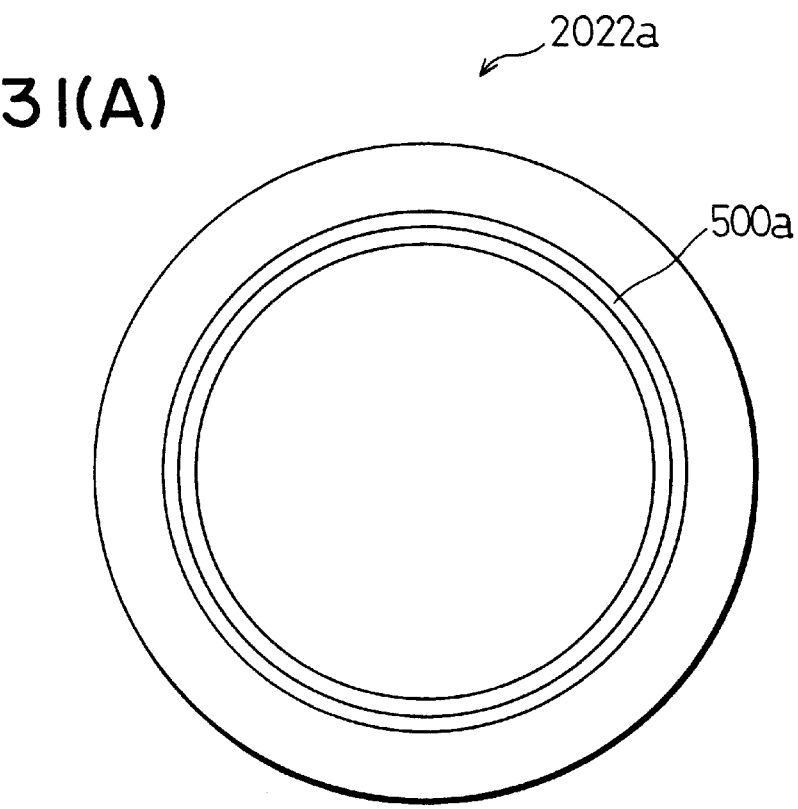
FIGS. 31(A) and 31(B) are a plan view and a side view, respectively, showing a spool used in the fifteenth embodiment.
Figure 31B:
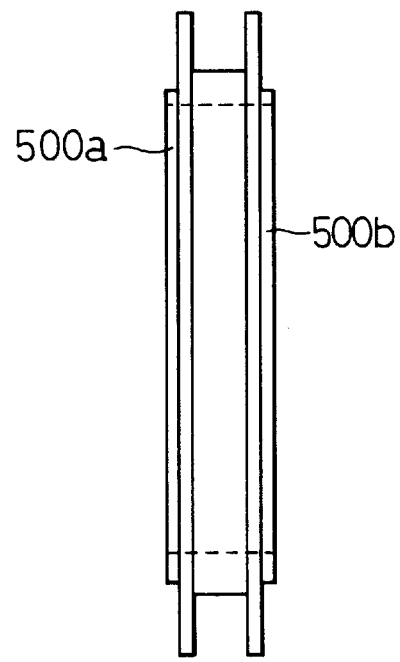

Referring to FIGS. 30, 31(A) and 31(B), a fifteenth embodiment according to the present invention will be described. This embodiment differs from the second embodiment shown in FIGS. 4, 5A and 5B only in the shape of the spool or bobbin on which the electromagnetic coil is wound. That is, the spool 2022 in the second embodiment is replaced by a spool 2022a in the fifteenth embodiment. Functions and other structures of the fifteenth embodiment is the same as those of the second embodiment.

As shown in FIGS. 31(A) and 31(B), the spool 2022a is generally ring-shaped, and has a center hole in which the ring-shaped permanent magnet 27 is disposed and an outer peripheral space on which the electromagnetic coil 26 is wound. The spool 2022a also has a first rib 500a and a second rib 500b, both of which are ring-shaped and formed on both sides of the spool 2022a. The height and the width of the ring-shaped ribs 500a and 500b are chosen so that the ribs deforms slightly when they are pressed in the axial direction by a first core 25a and a second core 25b when the spool 2022a is assembled to the cores. Thus, the ribs and the cores tightly contact with each other throughout their entire length.

The ring-shaped permanent magnet 27, the electromagnetic coil 26, and the pair of cores 25a and 25b are assembled to the spool 2022a as shown in FIG. 30. Then, the assembled parts are molded in a molding die by a molding resin material 204 to form a single body. In the molding process, the molding material 204 flows into narrow spaces formed between one side of the spool 2022a and the first core 25a and the other side of the spool 2022a and the second core 25b. The molding material 204 enters from the core gap between the first and second cores 25a and 25b, and flows into the narrow spaces as shown by arrows in FIG. 30. That is, the molding material to the first core side flows through a path $\alpha 1!\alpha 2!\alpha 3$ and stops at a position of the first rib 500a. In the same manner, the molding material to the second core side flows through a path $\beta 1!\beta 2!\beta 3$ and stops at a position of the second rib 500b. In other words, the molding material does not flow beyond the positions of the ribs while it fills out the narrow spaces, the core gap and an outer peripheral space between the electromagnetic coil and the cores. Since the molding material does not reach to the permanent magnet 27, the magnet is not unnecessarily pressed in its radial direction by the pressure of the molding material. As shown in FIG. 30, the molding material 204 does not cover the outer surface of the cores 25a and 25b.

The rib formed on the spool in the fifteenth embodiment to prevent the molding material from flowing beyond a certain position may be applied also to the tenth embodiment shown in FIG. 18(A).

The rotational speed detector according to the present invention can be used for detecting rotational speed of many kinds of rotating objects, and is not limited to the wheel speed detection of a vehicle as exemplified in this specification.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A rotational speed detector for detecting a rotational speed of a wheel mounted on a rotatable axle of a vehicle, said axle being supported by a bearing and comprising an outer structure fixedly mounted on a body of said vehicle and an outer end covered by a cover mounted on said outer structure, said rotational speed detector comprising:

a sensor device molded with resin integrally with said cover, said sensor device comprising a magnet and an electromagnetic coil;

a rotor mounted on said rotatable axle, said rotor comprising a cylindrical surface facing said sensor device and spaced from said sensor device so as to create an air gap therebetween, said cylindrical surface comprising a plurality of alternating pillars and windows arranged along a rotational direction of said rotor;

a magnetic circuit formed by said sensor device and said rotor; and two magnetic switches forming part of said magnetic circuit, said two magnetic switches simultaneously switching between closed and opened states in response to a rotation of said rotor, and generating a rotational speed signal in said electromagnetic coil.

2. The rotational speed detector according to claim 1, wherein said sensor device further comprises a first magnetic core and a second magnetic core, said first magnetic core being attached to one side of said magnet and comprising an end bent to hold said magnet and said electromagnetic coil, said second magnetic core being attached to another side of said magnet and comprising a portion facing said end of said first magnetic core, forming a certain core gap therebetween.

3. The rotational speed detector according to claim 1, wherein said sensor device further comprises a pair of magnetic cores attached to respective sides of said magnet, said pair of magnetic cores comprising respective ends bent inwardly and facing each other, forming a certain core gap therebetween, said electromagnetic coil being wound on one of said magnetic cores.

4. The rotational speed detector according to claim 1, wherein said sensor device further comprises:
   a magnetic core comprising a first end attached to one side of said magnet, said magnetic core being bent to hold said electromagnetic coil therein and comprising a second end opposite said first end and forming an air gap facing said rotor; and
   projections formed on a side of said magnet opposite said one side of said magnet, said projections forming an air gap facing said rotor;
   wherein said second end and said projections face said rotor and respectively serve as said two magnetic switches.

5. The rotational speed detector according to claim 1, wherein said sensor device further comprises a pair of magnetic cores attached to respective sides of said magnet and holding said magnet and said electromagnetic coil therein, said pair of magnetic cores comprising respective ends forming an air gap for accommodating said cylindrical surface of said rotor and serving as said two magnetic switches.

6. The rotational speed detector according to claim 1, wherein said respective ends of said magnetic cores are slanted so as to form said core gap having a smallest dimension at a point nearest to said rotor surface and having a dimension which increases gradually until reaching a larger dimension at a point further from said rotor surface.

7. The rotational speed detector according to claim 2, wherein said respective ends of said magnetic cores are slanted so as to form said core gap having a smallest dimension at a point nearest to said rotor surface and having a dimension which increases gradually until reaching a larger dimension at a point further from said rotor surface.

8. The rotational speed detector according to claim 2, wherein said respective ends of said magnetic cores are slanted so as to form said core gap having a smallest dimension at a point nearest to said rotor surface and having a dimension which increases gradually until reaching a larger dimension at a point further from said rotor surface.

9. The rotational speed detector according to claim 3, wherein said core gap is ten to sixty-five percent of a length of said sensor device.

10. The rotational speed detector according to claim 5, wherein said respective ends of said pair of magnetic cores comprise respective claws facing said cylindrical surface of said rotor.

11. The rotational speed detector according to claim 5, wherein said respective ends comprise more than two claws facing said cylindrical surface of said rotor.

12. The rotational speed detector according to claim 1, wherein said windows have a substantially rectangular shape.

13. The rotational speed detector according to claim 1, wherein said windows comprise substantially rectangular slits having respective open ends.

14. The rotational speed detector according to claim 1, wherein said sensor device further comprises at least one magnetic core for forming said magnetic circuit, said magnetic core comprising an end portion having a plurality of claws facing said cylindrical surface of said rotor, said claws being spaced at spatial intervals equal to spatial intervals between said alternating pillars and windows.

15. The rotational speed detector according to claim 1, wherein said rotor is disposed outside of said sensor device.

16. The rotational speed detector according to claim 1, wherein said rotor is disposed inside said sensor device.

17. The rotational speed detector according to claim 1, wherein all components of said sensor device are molded together in one piece by a molding material leaving a surface facing said rotor unmolded.

18. The rotational speed detector according to claim 2, wherein all components of said sensor device are molded together in one piece by a molding material leaving a surface facing said rotor unmolded.

19. The rotational speed detector according to claim 3, wherein all components of said sensor device are molded together in one piece by a molding material leaving a surface facing said rotor unmolded.

20. The rotational speed detector according to claim 4, wherein all components of said sensor device are molded together in one piece by a molding material leaving a surface facing said rotor unmolded.

21. The rotational speed detector according to claim 1, wherein said pair of magnetic cores comprise respective series of claws, the number of claws in each said series of claws being the same, said pair of magnetic cores comprising positioning means for making said series of claws on each of said pair of magnetic cores face each other when said pair of magnetic cores are assembled.

22. The rotational speed detector according to claim 21, wherein said sensor device further comprises a spool on which said electromagnetic core is wound, and wherein said positioning means comprise a plurality of projections provided on said spool and portions provided on at least one of said cores defining holes for receiving said projections.

23. A rotational speed detector for detecting a rotational speed of a wheel mounted on a rotatable axle of a vehicle, said axle being supported by a bearing and comprising an outer structure fixedly mounted on a body of said vehicle and an outer end covered by a cover mounted on said outer structure, said rotational speed detector comprising:
   a sensor device having a permanent magnet, a spool, an electromagnetic coil wound on said spool, and a pair of magnetic cores attached to respective sides of said magnet and holding said magnet and said coil therein, said pair of magnetic cores comprising respective ends, each of said respective ends comprising a respective series of claws bent inwardly to form a core gap;
   a rotor made of a magnetic material and comprising a cylindrical surface exposed so as to face said respective series of claws of said pair of magnetic cores and spaced from said claws so as to create an air gap therebetween, said cylindrical surface comprising a plurality of alternating pillars and windows along a rotational direction of said rotor, said alternating and pillars and windows being formed at spatial intervals corresponding to and equal to spatial intervals of said claws;
   a magnetic circuit formed by said sensor device and said cylindrical surface of said rotor; and
   two magnetic switches forming part of said magnetic circuit, said two magnetic switches simultaneously switching between closed and opened states in response to a rotation of said rotor, and generating signals corresponding to a rotational speed of said rotor in said electromagnetic coil.

24. The rotational speed detector according to claim 23, wherein said magnet comprises a ring-shaped member and an outer groove serving as a spool on which said electromagnetic coil is wound, said ring-shaped member comprising two axially divided pieces, each of said axially divided pieces being made of synthetic resin comprising magnet powder dispersed therein.

25. The rotational speed detector according to claim 24, wherein said magnet powder comprises ferride magnet material.

26. The rotational speed detector according to claim 24, wherein said magnet powder is oriented in a direction encircling said electromagnetic coil wound on said outer groove of said magnet.

27. The rotational speed detector according to claim 24, further comprising an insulation layer formed on at least a surface of said outer groove of said magnet.

28. The rotational speed detector according to claim 27, wherein said insulation layer is formed by solidifying only said synthetic resin on said surface of said magnet in a molding process of said magnet.

29. The rotational speed detector according to claim 23, wherein said pair of magnetic cores, said magnet, said spool, and said electromagnetic coil are all molded together by a molding material into one piece leaving an outer surface of said pair of said magnetic cores uncovered with molding material, and wherein said molding material is spilled inside spaces between said spool and said magnetic cores and is prevented from flowing beyond positions where means for closing said side spaces are provided on side walls of said spool.

30. The rotational speed detector according to claim 29, wherein said closing means comprises a circular rib formed on each side of said spool.

31. The rotational speed detector according to claim 30, wherein said circular rib is pressed and deformed by said core to create a tighter contact therebetween when said circular rib is assembled with said core.

32. A method of manufacturing a rotational speed detector for detecting a rotational speed of a wheel mounted on a rotatable axle of a vehicle, said axle being supported by a bearing and comprising an outer structure fixedly mounted on a body of said vehicle and an outer end covered by a cover mounted on said outer structure, said rotational speed detector comprising a rotor mounted on said rotatable axis, said rotor comprising a cylindrical surface comprising a plurality of alternating pillars and windows along a rotational direction of said rotor, and comprising a sensor device comprising a permanent magnet, a spool, an electromagnetic coil wound on said spool, and a pair of magnetic cores housing said magnet therein and further housing said coil wound on said spool, said sensor device being disposed so as to face said surface of said rotor so as to form an air gap therebetween, a magnetic circuit being formed by said rotor and sensor device and being closed and opened alternately by two magnetic switches formed in said magnetic circuit in series when said rotor is rotated, electrical signals being generated in said sensor device corresponding to a rotational speed of said wheel, said method comprising:

preparing said pair of magnetic cores, each of said magnetic cores comprising a substantially disk-shaped member and comprising claws formed on a periphery of said disk-shaped member;

preparing said permanent magnet, said permanent magnet comprising a ring-shaped member;

forming said spool to be substantially ring-shaped and to have a U-shaped groove at an outer periphery thereof and ribs formed on both outer sides of said spool;

winding said electromagnetic coil on said U-shaped groove of said spool;

assembling a single body comprising said permanent magnet and said spool on which said electromagnetic coil is wound together with said pair of magnetic cores, said pair of magnetic cores holding said magnet and said spool therein, claws of one of said pair of magnetic cores facing claws of another of said pair of magnetic cores and forming a gap therebetween;

inserting said assembled single body into a molding die so said ribs of said spool are pressed against sides of said pair of magnetic cores to make said ribs tightly contact said sides of said pair of magnetic cores; and molding said assembled single body into a solid piece comprising said sensor device by supplying a molding material from said core gap to fill spaces between said sides of said spool and sides of said pair of magnetic cores and between an outer periphery of said coil and said claws, while preventing the molding material from flowing beyond positions of said ribs.

33. A rotational speed detector for detecting a rotational speed on a wheel mounted on a rotatable axle of a vehicle, said axle being supported by a bearing and comprising an outer structure fixedly mounted on a body of said vehicle and an outer end covered by a cover mounted on said outer structure, said rotational speed detector comprising:

a sensor device molded with resin integrally with said cover, said sensor device comprising a magnet and an electromagnetic coil;

a rotor mounted on said rotatable axle, said rotor comprising a cylindrical surface facing said sensor device and spaced from said sensor device so as to create an air gap therebetween, said cylindrical surface comprising a plurality of alternating pillars and windows along a rotational direction of said rotor;

a magnetic circuit formed by said sensor device and said rotor; and two magnetic switches forming part of said magnetic circuit, said two magnetic switches simultaneously switching between closed and opened states in response to a rotation of said rotor, and generating a rotational speed signal in said electromagnetic coil;

said sensor device further comprising a pair of magnetic cores disposed on respective sides of and housing said magnet and said electromagnetic coil, said pair of magnetic cores comprising respective ends bent inwardly and facing each other, forming a certain core gap therebetween, said core gap comprising between ten and sixty-five percent of a length of said sensor device.

34. The rotational speed detector according to claim 33, wherein said pair of magnetic cores comprises a first magnetic core and a second magnetic core, said first magnetic core being attached to one side of said magnet and being bent to hold said magnet and said electromagnetic coil, said second magnetic core being attached to another side of said magnet and comprising an extending portion facing said end of said first magnetic core, forming said certain core gap therebetween.

35. The rotational speed detector according to claim 33, wherein said electromagnetic coil is wound on one of said magnetic cores.

36. The rotational speed detector according to claim 33, wherein said respective ends of said pair of magnetic cores are slanted to form said core gap having a smallest dimension at a point closest to said rotor surface and having a dimension increasing gradually toward a larger distance from said rotor surface.

37. The rotational speed detector according to claim 33, wherein said windows are substantially rectangular in shape.

38. The rotational speed detector according to claim 33, wherein said windows comprise substantially rectangular slits having respective open ends.

39. The rotational speed detector according to claim 33, wherein said magnetic cores of said pair of magnetic cores comprise respective sets of claws facing said cylindrical surface of said rotor, each said set of claws comprising claws spaced at spatial intervals equal to spatial intervals between said pillars and windows.

40. The rotational speed detector according to claim 33, wherein said rotor is disposed outside of said sensor device.

41. The rotational speed detector according to claim 33, wherein said rotor is disposed inside of said sensor device.

42. The rotational speed detector according to claim 33, wherein each magnetic core of said pair of magnetic cores comprises a series of claws, a number of claws in said series of claws of one of said magnetic cores being equal to a number of claws in said series of another of said magnetic cores, one of said magnetic cores comprising positioning means for making said claws on both of said magnetic cores face each other when said pair of magnetic cores are assembled.

43. The rotational speed detector according to claim 42, wherein said sensor further comprises a spool on which said electromagnetic coil is wound, and wherein said positioning means comprise a plurality of projections provided on said spool and portions of at least one of said cores defining holes for receiving said projections.

44. A rotational speed detector for generating a signal indicative of a rotational speed of a wheel of a vehicle, said wheel being supported by a rotatable axle, said axle having an end portion, said end portion being supported by a bearing and an outer structure fixedly mounted to said vehicle, said rotational speed detector comprising:

a cover covering said end portion and comprising a resin molded portion;

a sensor device integrally formed within said resin molded portion, said sensor device comprising a magnet and an electromagnetic coil;

a rotor mounted on said rotatable axle, said rotor comprising a cylindrical surface facing said sensor device, said cylindrical surface comprising a plurality of pillars and windows arranged along a circumferential direction of said cylindrical surface;

a magnetic circuit formed by said sensor device and said rotor; and a plurality of magnetic switches forming part of said magnetic circuit, said plurality of magnetic switches simultaneously switching between closed and opened states in response to a rotation of said rotor and generating a rotational speed signal in said electromagnetic coil.

45. A rotational speed detector for generating a signal indicative of a rotational speed of a wheel of a vehicle, said vehicle being supported by a rotatable axle, said axle having an end portion, said end portion being supported by a bearing and an outer structure fixedly mounted to said vehicle, said rotational speed detector comprising:

cover means for covering said end portion, said cover means comprising a resin molded portion comprising means for integrally holding a sensor device;

said sensor device integrally formed within said resin molded portion, said sensor device comprising a magnet and an electromagnetic coil;

a rotor mounted on said rotatable axis, said rotor comprising a cylindrical surface facing said sensor device, said cylindrical surface comprising a plurality of alternating pillars and windows arranged along a circumferential direction of said cylindrical surface;

a magnetic circuit formed by said sensor device and said rotor; and magnetic switch means forming part of said magnetic circuit, said magnetic switch means simultaneously switching between closed and opened states in response to a rotation of said rotor and generating a rotational speed signal in said electromagnetic coil.

* * * * *